(12) United States Patent
Taylor

(10) Patent No.: US 8,443,382 B2
(45) Date of Patent: May 14, 2013

(54) ACCESS CONTROLS FOR MULTIMEDIA SYSTEMS

(75) Inventor: Eugene W. Taylor, Chesapeake, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 531 days.

(21) Appl. No.: 12/731,336

(22) Filed: Mar. 25, 2010

(65) Prior Publication Data

US 2011/0236872 A1 Sep. 29, 2011

(51) Int. Cl.
*H04N 7/16* (2011.01)
(52) U.S. Cl.
USPC .......................................................... 725/29
(58) Field of Classification Search .................. None
See application file for complete search history.

(56) References Cited

U.S. PATENT DOCUMENTS

| | | | |
|---|---|---|---|
| 2004/0261097 A1* | 12/2004 | Hanks | 725/29 |
| 2007/0073874 A1* | 3/2007 | Moghaddam et al. | 709/224 |
| 2008/0155538 A1* | 6/2008 | Pappas | 718/100 |
| 2008/0168274 A1* | 7/2008 | Natanzon et al. | 713/175 |
| 2009/0068984 A1* | 3/2009 | Burnett | 455/408 |

\* cited by examiner

*Primary Examiner* — Brian Pendleton
*Assistant Examiner* — Fernando Alcon

(57) ABSTRACT

A media client stores separate account settings for multiple user accounts, where each of the separate user accounts includes access time limits for use of devices associated with the media client. The media client also receives a login request for one of the user accounts, and retrieves, based on account settings for the active account, interactive content for the active account. The media client presents to a user of the active account the interactive content and receives user input responding to the interactive content. The media client adjusts the access time limits for the devices, based on the user input and the account settings for the active account, and monitors usage time of the devices by the user of the active account. The media client blocks access to one of the devices when a monitored usage time exceeds the adjusted access time limit for the corresponding device.

24 Claims, 17 Drawing Sheets

ACCESS CONTROLS FOR MULTIMEDIA SYSTEMS

BACKGROUND INFORMATION

A continually increasing number of multimedia options are being offered through home multimedia networks. Unlimited access to these options may not be desirable for certain age groups. Thus, parental controls may be used to prevent access to individual devices or particular content within a home network. However, such controls are generally not integrated among multiple devices.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit a subscription multimedia service provider to provide access controls for devices in a home multimedia network. The access controls may be customized by an administrator (e.g., a parent) on a media client at a customer premises. The access controls may include accounts for each potential user and may provide age-appropriate questions that a user (e.g., a child) can answer to gain access privileges to one or more media devices, such as television, gaming consoles, computers, etc. The age-appropriate questions may be related to, for example, academic subjects, assigned homework, areas of interest, etc. Thus, implementations described herein may provide positive incentives to balance educational and entertainment options.

As used herein, the term "media client" may refer to any media processing device that may receive multimedia content over a network, and may provide such multimedia content to an attached display device (such as a television or computer monitor). A "subscription multimedia service," as used herein, may refer to television, telephone, networking and/or other multimedia services provided to customers over a closed distribution network. A closed distribution network may include, for example, cable, optical fiber, satellite, or virtual private networks that restrict unauthorized alteration of content delivered by a multimedia service provider.

Also, as used herein, the terms "user" and "viewer" may refer interchangeably to a person who interacts with, orders, uploads, listens to, or plays multimedia content from a subscription multimedia service. Furthermore, the terms "controlled access content" and "access questions" may refer to information and interactive content presented to a user, responses to which may affect an availability of controlled media to the user. The term "age-appropriate," as used herein may be broadly construed to refer to a projected logical, academic, educational, or scholastic competency of a user.

Figure 1:
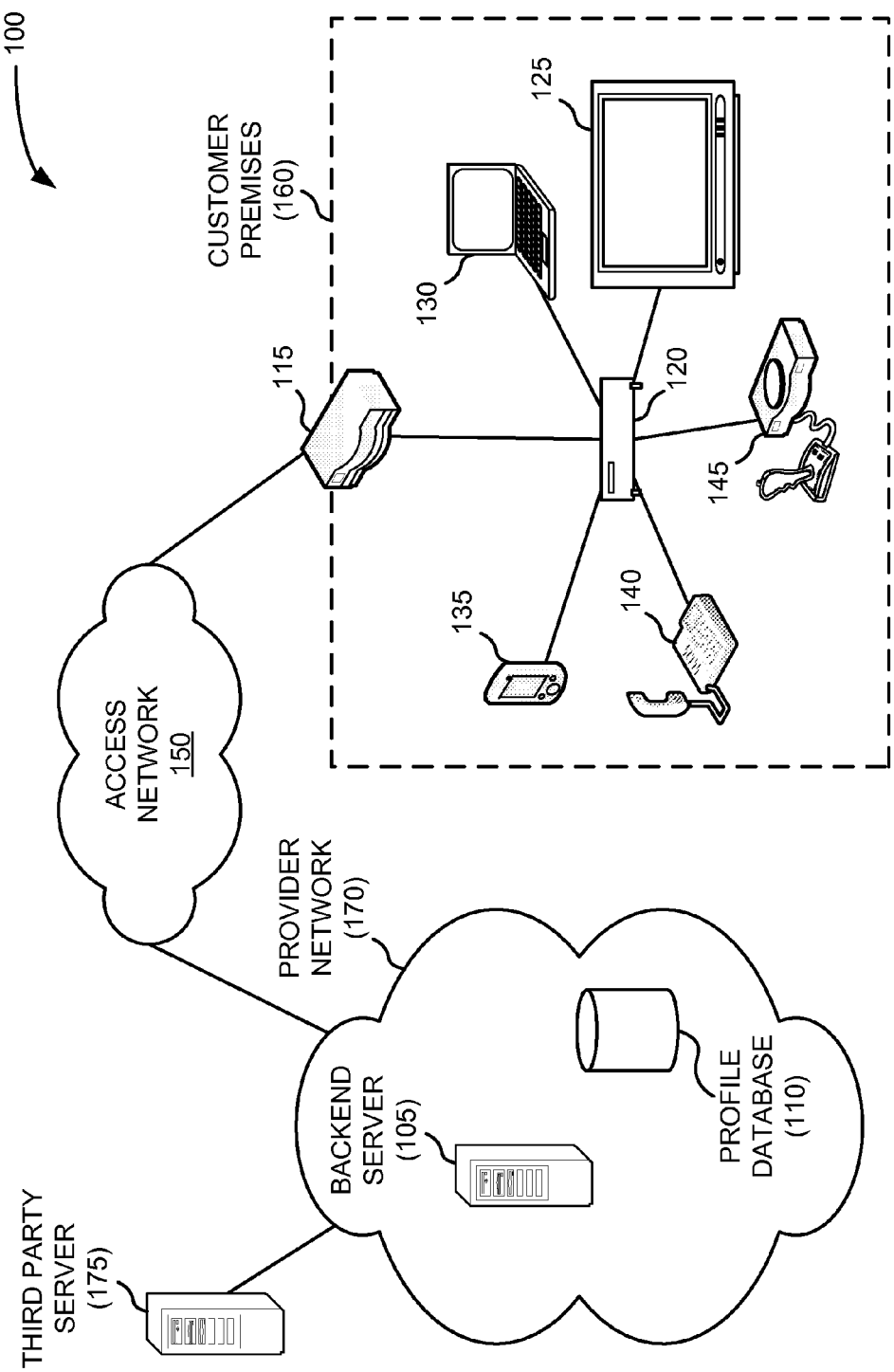
FIG. 1 depicts an exemplary network in which systems and/or methods described herein may be implemented.

FIG. 1 is a diagram of an exemplary network 100 in which systems and/or methods described herein may be implemented. As illustrated, network 100 may include a backend server 105, a profile database 110, a gateway 115, a media client 120, a display device 125, a computing device 130, a cellular phone 135, a telephone 140, a gaming system 145, and an access network 150. Gateway 115, media client 120, display device 125, computing device 130, cellular phone 135, telephone 140, and gaming system 145 may be located within (or associated with) a customer's premises 160, which may include a home network. Backend server 105 and profile database 110 may be included within a provider network 170. Customer premises 160 may connect to provider network 170 via access network 150. A third-party server 175 may also connect to provider network 170. Components of network 100 may interconnect via wired and/or wireless connections.

Backend server 105 may include one or more server devices, or other types of computation or communication devices, that are capable of providing content/information to media client 120 and/or display device 125 in accordance with signals that are issued from media client 120. Examples of backend server 105 may include a content server that provides applications and data, a headend device that provides broadcast television programs and/or pay-per-view (PPV) events, a video-on-demand (VOD) device or another device that provides multimedia content upon request, and/or a program guide information server that provides information related to multimedia content available to media client 120. In general, backend server 105 may provide applications and/or information to enable access controls for devices within customer premises 160, such as display devices 125, and/or other network connectivity devices (e.g., computing devices 130, cellular phones 135, telephones 140, gaming system 145, etc.) associated with media client 120. Backend server 105 may communicate with a variety of other components, such as third-party servers (e.g., third-party server 175), databases (e.g., profile database 110), gateways, web servers, network switches or routers, television broadcast facilities, and other servers to facilitate delivery of access control information to customers via access network 150.

Database 110 may include one or more memory devices that maintain user account profiles for media clients 120. User account profiles may include, for example, one or more administrator (e.g., parent) accounts that may establish access control settings and one or more user (e.g., child) accounts that may have restricted access. Additionally, or alternatively, user account profiles may be stored locally at media client 120. In one implementation, profile database 110 may include account information regarding current subscriptions with a multimedia service provider. Subscription information may include information associated with subscriptions for services (e.g., television, Internet, landline phone, and/or mobile phone service packages), hardware (e.g., media client models, remote control types, telephone models, mobile phone models, etc.), and software (e.g., media client operating system, etc.) associated with customer premises 160.

Database 110 may also include information regarding other equipment associated with customer premises 160 (e.g., equipment not particularly related to current subscriptions with a multimedia service provider). For example, database 110 may store information regarding features of display devices 125, computing devices 130, telephones 140, gaming system 145, etc. Additionally, database 110 may include content for access questions. For example, content for access questions (which may include both questions and separate answers to the questions) may be received from third-party server 175. While only one database is shown in FIG. 1, profile database 110 may include multiple databases stored locally at provider network 170 and/or stored at one or more different and possibly remote locations. Profile database 110 may group account profiles based on individual users or user groups (e.g., based on common equipment/service types, common projected academic ability, etc.). Information from database 110 may be retrieved by backend server 105 (or another server device) to generate age-appropriate questions for users and, for example, to monitor, such user response rates, etc.

Gateway 115 may include a network device that provides an interface from access network 150 to media clients 120, computing devices 130, telephones 140, and other network connectivity devices (not shown). For example, when telecommunication services are provided to customer premises 160 via an optical fiber, gateway 115 may include an optical network terminal (ONT) that connects to the optical fiber. The ONT may convert between signals appropriate for display device 125 and signals appropriate for transmission over optical fiber. For example, the ONT may include a coaxial cable connection that leads to media client 120. While FIG. 1 shows local devices (e.g., computing devices 130, cellular phones 135, telephones 140, gaming system 145, etc.) connected to media client 120, in other implementations the local devices may connect directly to gateway 115. Thus, the ONT may also include an Ethernet output port for connecting to computing device 130 or gaming system 145, a voice over Internet protocol (VoIP) telephone port for connecting to a VoIP device, and/or a standard telephone port for connecting to a standard telephone.

Gateway 115 may include one of a number of possible gateway devices, including, for example, a satellite antenna and receiver, a coaxial cable connection, an ONT, or a broadband access for Internet Protocol TV (IPTV). The satellite antenna and receiver may provide an interface for multimedia service broadcast from satellites. The coaxial cable connection may provide an interface for multimedia service connected to a customer via coaxial cables. The ONT may provide an interface for an optical fiber connection. The broadband IPTV connection may generally include any device that provides broadband access over which multimedia service may be provided.

Media client 120 may include any device capable of receiving, transmitting and/or processing information to and/or from access network 150. In one implementation, media client 120 may be a closed device (e.g., including a hardware/software configuration that is not accessible to the general public) that restricts unauthorized alteration of programming delivered over a closed distribution network. Media client 120 may provide video and/or data signals to display device 125 and other media devices. Examples of media client 120 may include a set-top box, a computer, a cable card, and a portable electronic device. Media client 120 may, for example, receive a television signal from gateway 115, may convert the signal to a form usable by display device 125, and may transmit the signal to display device 125 for display. In one implementation, as shown in FIG. 1, media client 120 may serve as a hub for multiple media devices, such as display device 125, computing device 130, cellular phone 135, telephone 140, gaming system 145, a digital video disc (DVD) player, a digital video recorder (DVR), and/or other media devices of customer premises 160. As described further herein, media client 120 may maintain different user accounts that may each have different access privileges for each media device associated with media client 120.

In some implementations, media client 120 may also detect data, such as usage time, of media devices in communication with media client 120 (e.g., display devices 125, computing devices 130, cellular phones 135, telephones 140, gaming system 145, etc.). Media client 120 may further allow a user to provide user input for interactive television applications (e.g., to navigate menu displays, select menu items, and/or input text) and to alter the programming provided to display device 125 based on a signal (e.g., a channel up or channel down signal) received from, for example, a remote control. In some implementations (e.g., when authorized by a customer as part of an access control system), user input, an amount of viewing time of particular channels, an amount of use of other devices, and other data may be tracked/stored within a memory of media client 120. Media client 120 may also be capable of sending tracked data (e.g., user input records, features of other devices, etc.) to and/or receiving data from backend server 105, computing device 130, cellular phone 135, telephone 140, gaming system 145, etc. In some implementations, media client 120 may be incorporated into display device 125, such as a television, a computer, or a portable electronic device.

Display device 125 may include a digital or analog display that a user may use to view multimedia content (including, for example, conventional programming, interactive displays, and/or promotions). Display device 125 may refer to any device that can receive and display multimedia content delivered over access network 150 and/or through media client 120 for perception by users. Display device 125 may include technologies such as cathode ray tube (CRT) displays, liquid crystal displays (LCDs), light-emitting diode (LED) displays, plasma displays, etc.

Computing device 130 may include a device such as, for example, a desktop computer, a laptop computer, a personal digital assistant (PDA), etc., used for general computing tasks. In some implementations, computing device 130 may be configured to receive and display television programming (e.g., IPTV). Computing devices 130 may also be used by users to access accounts with Internet service providers (ISPs) to send/receive content over access network 150.

Cellular phone 135 may include a radiotelephone, a personal communications system (PCS) terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer (e.g., with a broadband air card), or other types of communication devices. In some implementations, cellular phone may communicate with media client 120 via wired (using, e.g., a universal serial bus (USB) port) and/or wireless (e.g., Bluetooth) connections.

Telephone 140 may include may include a telephone designed to communicate over the public switched telephone network (PSTN) and/or a telephone designed to communicate based on the VoIP protocol.

Gaming system 145 may include a computing device optimized for gaming entertainment. Gaming system 145, for example, may include proprietary interface to operate particular software.

Access network 150 may include a video signaling and distribution network and system that permit transfer of data between backend server 105 and gateway 115/media client 120. Additionally, access network 150 may include, among other things, a firewall, a filtering mechanism, a proxy, and/or network address translation mechanisms. Access network 150 may include, for example, a single network, such as a wide area network (WAN), a local area network (LAN), a metropolitan area network (MAN), a telephone network (e.g., a PSTN or a wireless network), the Internet, a satellite network, etc., or a combination of networks. Access network 150 may provide customers, within a closed distribution network, with multimedia content provided, for example, by backend server 105. Access network 150 may also support communications between backend server 105 and media clients 120 using, for example, Internet protocol.

Third-party server 175 may include one or more communication or computation devices to provide content to devices within provider network 170. For example, third-party server 175 may supply formatted questions that may be retrieved by a backend server 105 and provided to media client 120 for use as access questions for a particular user account. In some implementations, third-party-server 175 may reside within an educational institution (e.g., a school or university) or information supplier (e.g., a curriculum developer) that may supply content (e.g., age-appropriate and/or topic specific questions) for use as access questions by media client 120. In one implementation, third-party server 175 may be controlled by a local school (e.g., a school attended by a user associated with a particular user account) to supply current academic content (e.g., homework assignments, extra-credit problems, etc.) that may be used as access questions. Third-party server 175 may provide content in response to a real-time request (e.g., in association with a login request by a user of media client 120) or in advance of a login request.

In another implementation, third-party server 175 may include a server for a social networking account (e.g., Facebook, MySpace, etc.). Third-party server 175 may, for example, post achievements on an account associated with the user account(s) for media client 120. In another implementation, third-party server 175 may also serve a monitoring function, such as providing emails or tweets to an administrator (e.g., parent), if an associated user has (or has not) accrued usage time during a particular period.

In implementations described herein, backend server 105 may provide a set of access controls to media client 120. Via a user interface included with the access controls, an administrator (e.g., a parent) may create an account profile for each prospective user (e.g., each family member) to access devices (e.g., computing devices 130, cellular phones 135, telephones 140, gaming system 145, etc.) connected to media client 120. The account profile may be a local profile (e.g., limited to a particular device or home network) or a roaming profile (e.g., stored at database 110 and accessible from multiple devices via access network 150). The access controls may be implemented continually or during set time periods (e.g., weekday afternoons, weekends, etc.) for each user account. When active, the access controls of media client 120 may require a user to log into a particular user account. In one implementation, media client 120 may request backend server 105 to provide a customized set of access questions for a particular user.

The access questions may be requested at the time of or in advance of a user logging on. Backend server 105 may retrieve appropriate access questions (e.g., from profile database 110, third-party server 175, or another location) and provide the access questions to media client 120. The access questions may include, for example, educational questions, homework assignments, questions of general interest, etc. Media client 120 may present the questions to the user prior to enabling user access to one or more networked devices (e.g., computing devices 130, cellular phones 135, telephones 140, gaming system 145, etc.). A user may answer the questions and, for example, accrue time toward the use of the networked devices based on a number of correct answers. Media client 120 may monitor the accrued time and usage time for each of the network devices, and, for example, block access to any device for which no accrued time exists. In one implementation, media client 120 may also provide user input (e.g., the user answers to questions) to backend server 105 for storage in profile database 110 and/or delivery to third-party server 175. The user input may be tracked, for example, to monitor progression and/or advancement, avoid repetitive questions, or provide rewards.

The number of components illustrated in FIG. 1 is provided for simplicity. In practice, network 100 could include fewer, different, differently arranged, or additional components than illustrated in FIG. 1. For example, backend server 105 may include a virtual server, that is, the server may include a group of servers that may logically appear as one server. Also, backend server 105 and/or profile database 110 may connect to one or more databases and other servers (not shown) to store and/or retrieve customer data and/or multimedia content. Additionally, of customer premises 160 may include fewer, different, differently arranged, or additional devices than shown in FIG. 1. Furthermore, in some instances, one or more of the components of network 100 may perform one or more functions described as being performed by another one or more of the components of network 100.

Figure 2:
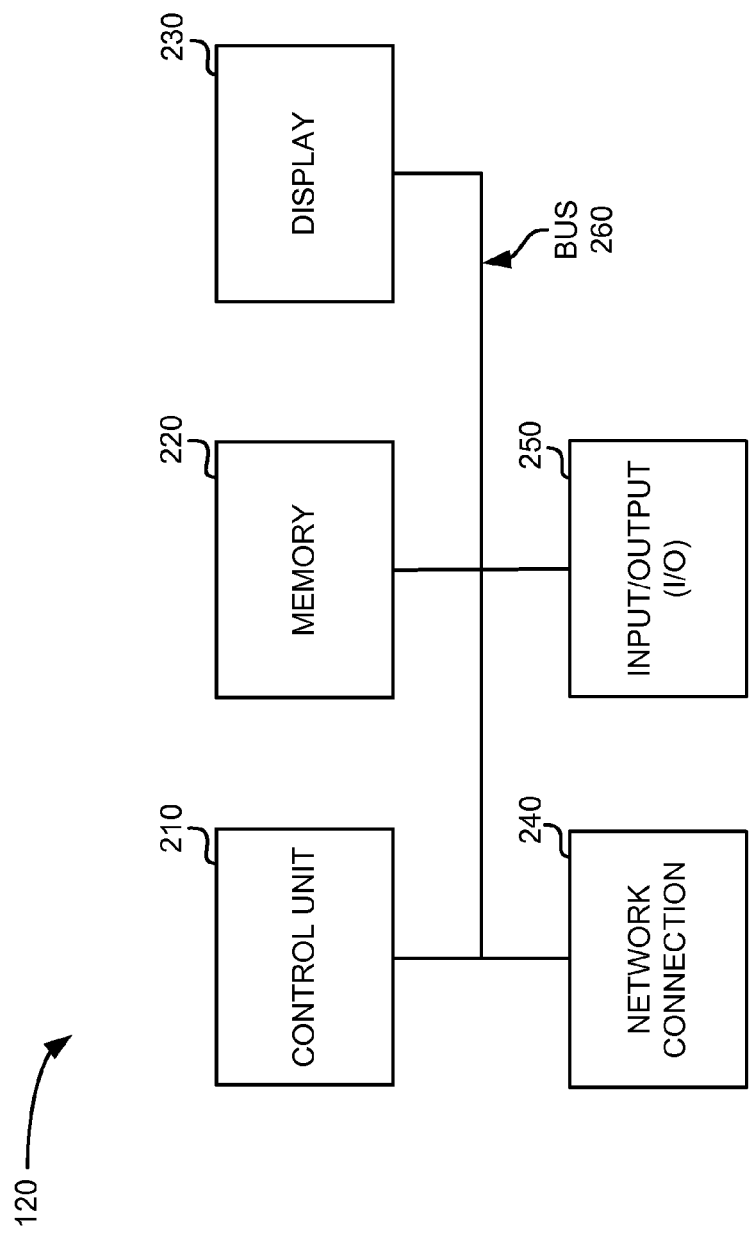
FIG. 2 is a block diagram of exemplary components of a media client that may be used in the network of FIG. 1.

FIG. 2 is diagram illustrating exemplary components of media client 120. As shown, media client 120 may include a control unit 210, a memory 220, a display 230, a network connection 240, an input/output (I/O) component 250, and a bus 260.

Control unit 210 may include one or more processors, microprocessors, or another type of processing device that interprets and executes instructions. Among other functions, control unit 210 may collect/store viewer activity associated with television programming and information about local devices (e.g., devices which may be in communication with media client 120). Control unit 210 may execute instructions to send collected data to another device, such as backend server 105. Control unit 210 may also receive information and/or instructions from other devices, such as backend server 105.

Memory 220 may include one or more dynamic or static storage devices that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, memory 220 may store an activity log (e.g., including responses to access questions) and a local device log (e.g., tracking accrued time and/or usage time) to send at a later point in time, such as when requested by backend server 105.

Display 230 may include any component capable of providing visual information. For example, in one implementation, display 230 may be a light emitting diode (LED) or a liquid crystal display (LCD). In another implementation, display 230 may use another display technology, such as a dot matrix display, etc. Display 230 may display, for example, text (such as a time, a date or a channel selection), image, and/or video information.

Network connection 240 may include any transceiver-like mechanism that enables media client 120 to communicate with other devices and/or systems, such as backend server 105 and computing device 130. For example, network connection 240 may include an Ethernet interface, an optical interface, a coaxial interface, a radio interface, a USB interface, or the like. Network connection 240 may allow for wired and/or wireless communication.

Input/output devices 250 may generally include user input devices such as external buttons, and output devices, such as LED indicators. With input/output devices 250, a user may generally interact with media client 120. In some implementations, input/output devices 250 may be implemented via a remote control. Bus 260 may provide an interface through which components of media client 120 can communicate with one another.

As will be described in detail below, media client 120 may perform certain operations relating to gathering information, receiving information, and communicating information to a server, such as backend server 105. Media client 120 may perform these operations in response to control unit 210 executing software instructions contained in a computer-readable medium, such as memory 220. A computer-readable medium may be defined as a physical or logical memory device. A logical memory device may refer to memory space within a single, physical memory device or spread across multiple, physical memory devices. The software instructions may be read into memory 220 from another computer-readable medium or from another device. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of media client 120, in other implementations, media client 120 may include fewer, different, differently arranged, or additional components than those depicted in FIG. 2. Additionally, or alternatively, one or more components of media client 120 may perform one or more other tasks described as being performed by one or more other components of media client 120.

Figure 3:
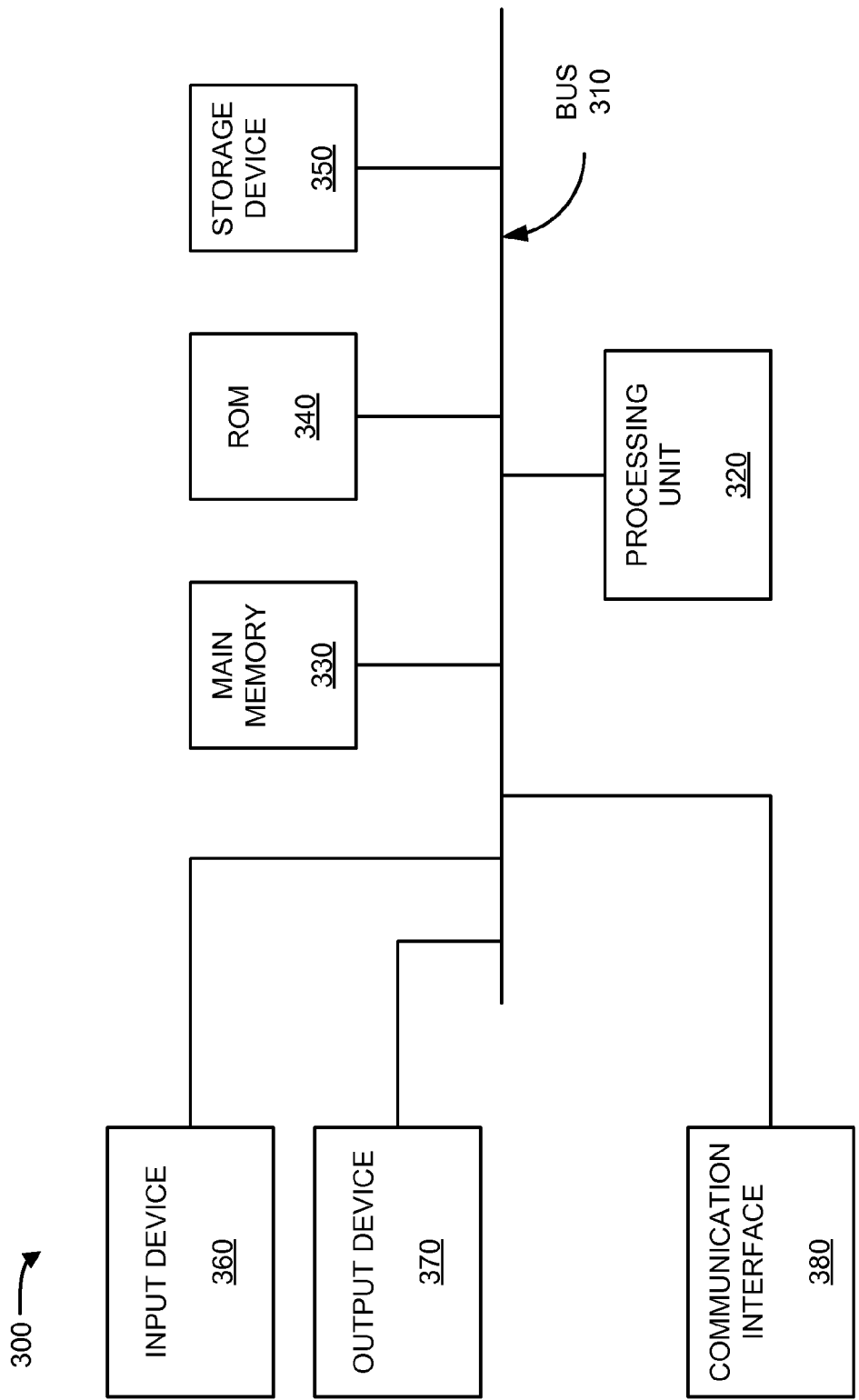
FIG. 3 is a block diagram of exemplary components of a device that may correspond to a backend server, third-party server, or user device of FIG. 1.

FIG. 3 is a diagram of exemplary components of a device 300 that may correspond to backend server 105, third-party server 175, and/or another device, such as computing device 130. As illustrated, device 300 may include a bus 310, a processing unit 320, a main memory 330, a ROM 340, a storage device 350, an input device 360, an output device 370, and a communication interface 380.

Bus 310 may include a path that permits communication among the components of device 300. Processing unit 320 may include one or more processors, microprocessors, or other types of processing units, such as application-specific integrated circuits (ASICs), field-programmable gate arrays (FPGAs), etc., that may interpret and execute instructions.

Main memory 330 may include a RAM or another type of dynamic storage device that stores information and instructions for execution by processing unit 320. ROM 340 may include a ROM device or another type of static storage device that may store static information and instructions for use by processing unit 320. Storage device 350 may include a magnetic and/or optical recording medium and its corresponding drive. In one implementation, storage device may include a database (e.g., profile database 110).

Input device 360 may include a mechanism that permits an operator to input information to device 300, such as a keyboard, a mouse, a pen, voice recognition and/or biometric mechanisms, a touch-screen interface, etc. Output device 370 may include a mechanism that outputs information to the operator, including a display, a printer, a speaker, etc. Communication interface 380 may include any transceiver-like mechanism that enables device 300 to communicate with other devices and/or systems, such as media client 120.

As will be described in detail below, device 300 may perform certain operations associated with providing customized promotions for a subscription multimedia service. Device 300 may perform these and other operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Although FIG. 3 illustrates exemplary components of device 300, in other implementations, device 300 may include fewer, different, differently arranged, or additional components than those depicted in FIG. 3. Additionally, or alternatively, one or more components of device 300 may perform one or more other tasks described as being performed by one or more other components of device 300.

Figure 4:
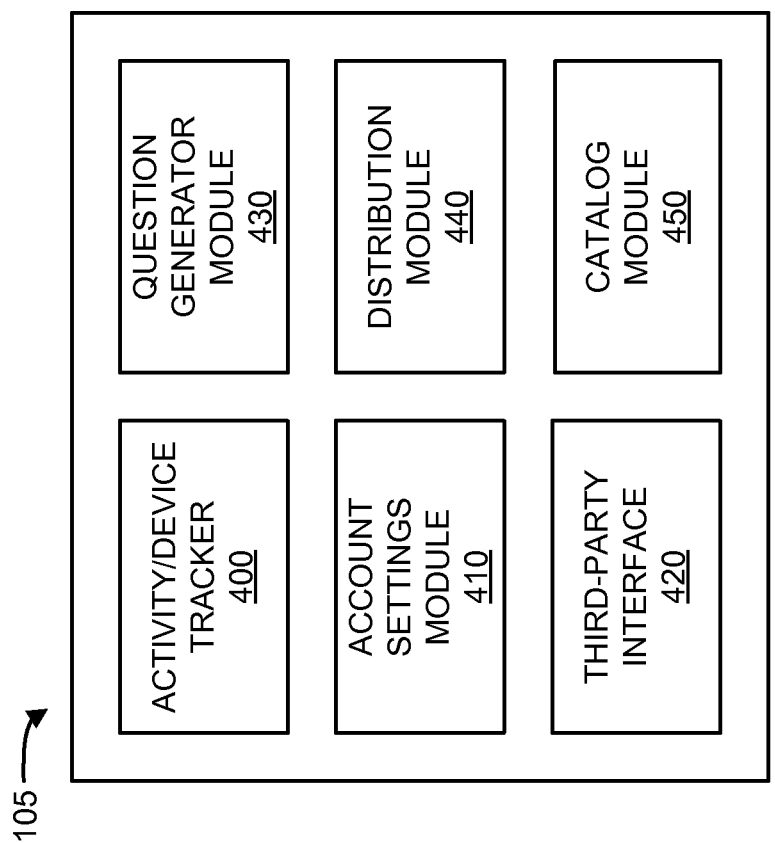
FIG. 4 depicts a diagram of exemplary functional components of the backend server illustrated in FIG. 1.

FIG. 4 is an exemplary diagram of functional components of backend server 105. The functional components of backend server 105 may be implemented by, for example, one or more of the components of device 300 (FIG. 3). As shown, backend server 105 may include an activity/device tracker 400, an account settings module 410, a third-party interface 420, a question generator module 430, a distribution module 440, and/or a catalog module 450.

Activity/device tracker 400 may include hardware or a combination of hardware and software to receive and/or solicit user activity data and local device data from media clients 120. For example, activity/device tracker 400 may receive user input histories (e.g., user responses to access questions) and information regarding other equipment associated with customer premises 160 (e.g., equipment not particularly related to current subscriptions with a multimedia service provider) provided from media clients 120. In some implementations, activity/device tracker 400 may receive updated information from media clients 120 at regular intervals or upon particular activities (e.g., upon completion of questions from an access control sequence). In other implementations, activity/device tracker 400 may send a signal to media client 120 to request updated information as needed. In still other implementations, updated activity and/or device information may be provided to activity/device tracker 400 in association with a request, from media client 120, for additional access questions. Data received by activity/device tracker 400 may be associated with an account profile and stored in a memory, such as profile database 110.

Account settings module 410 may include hardware or a combination of hardware and software that may store and retrieve account profile information for administrators and/or users of media clients 120. In one implementation, account settings module 410 may generate a data file that may be stored, for example, in database 110. In another implementation, account settings module 410 may receive and/or modify a data file generated by media client 120. Account settings module 410 may include, for example, information that may enable backend server 105 and/or media client 120 to identify access questions to be presented to a user during a controlled access process.

In one implementation, account settings module 410 may include listings for acceptable content within particular profiles. For example, as discussed further in connection with FIG. 5, a user profile may be limited to accessing pre-selected channels/content. Thus, the actual provisioning of the multimedia services from backend server 105 to media client 120 may be based on the active user profile for media client 120. In such an arrangement, only channels that are allowed for an active user profile may be sent from backend server 105 to media client 120 for the active user profile. By contrast, content distribution in conventional subscription television networks may provide a block of standard channels that are provisioned for all media clients, while relying on local devices (e.g., the local media client) to prevent unauthorized access. Limiting provisioning from backend server 105 based on active user profiles associated with media client 120 may, for example, provide more secure access controls and reduce the overall bandwidth use within access network 150.

In another implementation, account settings module 410 may include remote access capabilities, such that an administrator (e.g., a parent) may access media client 120 remotely (e.g., via a remote device (not shown) using an Internet connection in conjunction with backend server 105). Thus, account settings module 410 may permit an administrator to revise authorized program content settings for a user account in real time. For example, a parent may elect to remotely alter the authorized program content settings based on an indication (e.g., a request from a child) that special programming is occurring at a particular time.

Third-party interface 420 may include hardware or a combination of hardware and software that may communicate with one or more third-party servers (e.g., third-party server 175) to request and/or receive content. For example, third party interface 420 may receive unsolicited content updates from third-party server 175 that may be stored, for example, in database 110 for later retrieval. In another implementation, third party interface 420 may send a request for question sets to facilitate a real-time login process at media client 120. Third-party interface 420 may also send information to third-party server 175. For example, third-party interface 420 may send data (e.g., user responses to questions) received from media client 120. In one implementation, where third-party server 175 is an educational institution, the data may constitute a user's completed assignment (e.g., a homework assignment).

Question generator module 430 may include hardware or a combination of hardware and software to determine a customized set of access questions for presentation by a particular media client 120 to a particular user (based, e.g., on a user account login). For example, question generator module 430 may receive a request from media client 120 to generate a customized set of access questions for a particular user account. The request may be provided in advance of an access request by a user (e.g., to provide information to media clients 120 that may be stored locally by media clients 120 for later presentation) or provided in real-time (e.g., in conjunction with a user logging into a user account on media client 120). In response to the request, question generator module 430 may retrieve (e.g., from third party interface 420, catalog module 450, or another device) an age-appropriate set of access questions for the particular user account. In one implementation, question generator module 430 may retrieve a listing of available question sets from third party interface 420 and/or catalog module 450 and compare information in the account profile with available question sets from third party interface 420 and/or catalog module 450 to identify an appropriate access questions for the particular media client 120 and user account. In another implementation, question generator may identify locally-stored content (e.g., from catalog module 450) when access to third-party sever 175 is unavailable.

Distribution module 440 may include hardware or a combination of hardware and software to send selected controlled access content (e.g., access questions, video segments with follow-up access questions, etc.) to media client 120. For example, distribution module 440 may send selected controlled access content in-band within other multimedia content, such as video, audio, interactive applications, and/or images that may be requested by media client 120. Additionally, or alternatively, distribution module 440 may send selected controlled access content using an out-of-band distribution method. Distribution module 440 may also provide and/or update media client 120 applications to facilitate controlled access. Such applications to facilitate controlled access may include applications to enable interactive media sessions and instructions for media client 120 to collect/provide updated activity and/or device information to back-end server 105.

In another implementation, distribution module 440 may also provide multimedia provisioning based on recognition of an active user profile. Distribution module 440 may limit content delivery for media client 120 to only pre-selected channels associated with the active user profile. For example, a user account may be configured (e.g., by an account administrator/parent) to include only twelve particular channels (e.g., selected channels having family and/or educational content), and only those twelve channels may be streamed from backend server 105 to media client 120 when a person logs into that particular user account.

Catalog module 450 may include hardware or a combination of hardware and software that maintains listings of available content and/or actual content that may be a candidate for controlled access questions. Catalog module 450 may receive updated controlled access content, for example, from another device controlled by a network administrator. In one implementation, available content may include, for example, age/grade based content and/or topical content. For example, controlled access content may include study questions for standards of learning (SOL) and/or achievement tests for a particular grade level. As another example, controlled access content may include information and questions for unit studies (e.g., in-depth studies on a topic, such as a particular country, skill, person, historical event, etc.) that may be selected by a user or administrator of media client 120. In one implementation, controlled access content may include data that may be inserted, by media client 120, into a template for presentation on display device 125. In other implementations, controlled access content may include discrete program segments or files.

Although FIG. 4 illustrates exemplary functional components of backend server 105, in other implementations, backend server 105 may include fewer, different, differently arranged, or additional functional components than those depicted in FIG. 4. Additionally, or alternatively, one or more functional components of backend server 105 may perform one or more other tasks described as being performed by one or more other functional components of backend server 105.

Figure 5:
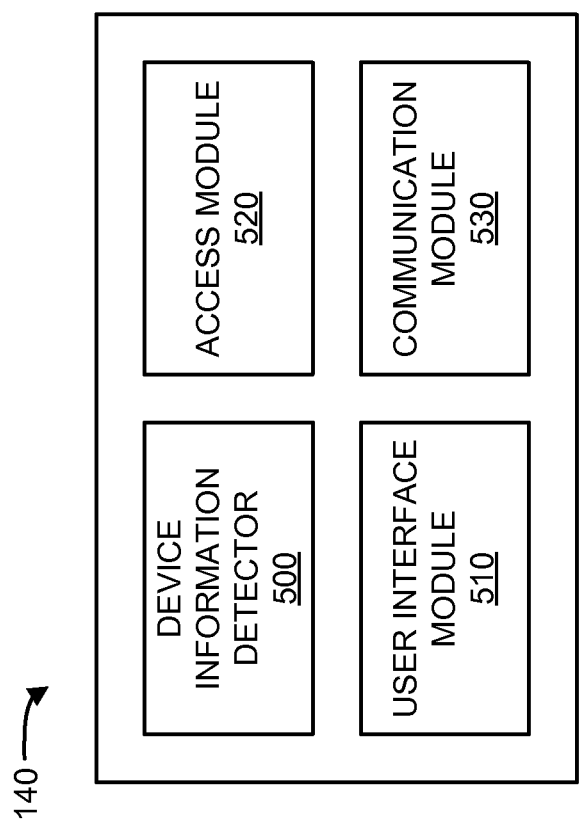
FIG. 5 depicts a diagram of exemplary functional components of the media client illustrated in FIG. 1.

FIG. 5 is a diagram of exemplary functional components of media client 120. The functional components of media client 120 may be implemented by, for example, one or more of the components of FIG. 2. As shown, media client 120 may include a device information detector 500, a user interface module 510, an access module 520, and a communication module 530.

Device information detector 500 may include hardware or a combination of hardware and software to collect and/or solicit user activity data and local device data at customer premises 160. For example, device information detector 500 may track user interactions with media client 120 and/or other devices (e.g., display device 125, computing device 130, cellular phone 135, telephone 140, and gaming system 145). User interactions with media client 120 may include, for example, commands issued from a viewer via a remote control, such as responses to controlled access content, channels selected, selection of other media that may be accessed through media client 120 (e.g., display device 125, computing device 130, cellular phone 135, telephone 140, or gaming system 145), etc.

Device information detector 500 may also obtain information about devices associated with customer premises 160, such as display device 125, computing device 130, cellular phone 135, telephone 140, and gaming system 145. In one implementation, device information detector 500 may obtain device information based on connections (e.g., wired or wireless connections) of media client 120 with other devices. Device information detector 500 may track, for example, usage time of individual devices for individual user accounts. Additionally, or alternatively, device information detector may track viewing time of individual channels (or types/groups of channels) for individual user accounts. For example, device information detector 500 may use a wireless connection with a device (e.g., gaming system 145) to determine if a particular device is being used when a particular user account is active. In another implementation, device information detector 500 may send a request to a connected device (e.g., computing device 130, cellular phone 135, etc.) to identify hardware and/or peripheral devices that may be subject to controlled access. In still another implementation, device information detector 500 may solicit information about attached devices from an administrator (e.g., via providing interactive menu options) when, for example, a connection to an auxiliary port of media client 120 is detected. For example, when a user connects a digital video disc (DVD) player or digital video recorder (DVR) to media client 120, media client 120 may solicit information from the user when the device is initially detected. Device information detector 500 may store user interaction histories and information regarding other equipment associated with customer premises 160 in a local memory (e.g., memory 220).

User interface module 510 may include hardware or a combination of hardware and software that may facilitate interaction with controlled access content via media client 120. Interactions may include, for example, use of a remote control to set up account profiles, navigate menus, present multiple choice questions, and receive selection of answers. Interactions may be implemented, for example, via a remote control interface with media client 120 and/or display device 125. In one implementation, user interface module 510 may cause display device 125 to present one or more account settings screens to permit an administrator (e.g., a parent) to establish controlled access settings for one or more users (e.g., children). User interface module 510 may also include a template to solicit information to enable an administrator to set controlled access parameters for each user individually, including, for example, projected academic ability, time accrual rates, total usage time limits, and/or device-specific usage time limits.

In one implementation, user interface module 510 may present a closed access paradigm, such that a default setting for some accounts (e.g., a child's account) default to allowing no access to media client 120 (and associated devices). Thus, only access to channels/devices that are affirmatively created (e.g., by an administrator/parent) via user interface module 510 may be granted to a particular user. Furthermore, if an account is reset (e.g., due to a system error or subscriber request), the account profile may default to no access rights, so as to not inadvertently grant unauthorized access (e.g., to content outside the scope of authorized program content settings) for a user account.

Access module 520 may include hardware or a combination of hardware and software to manage settings and access restrictions for media client 120 and other devices in customer premises 160. Access module 520 may retrieve (e.g., from local memory 220 or from backend server 105) controlled access content (e.g., information and questions) that may be presented to a user upon a successful login. Access module 520 may select controlled access content based on the user account profile and present questions to the user. For example, access module 520 may present controlled access content in sequence and track user responses to the controlled access content (e.g., responses to questions). Access module 520 may credit time for correct answers, according to increments and limits established in the user's account profile. Access module 520 may also receive usage information from device information detector 500 and prevent access to one or more devices (e.g., display device 125, computing device 130, cellular phone 135, telephone 140, and gaming system 145) when the tracked usage time reaches the assigned limit for a particular account profile. In one implementation (e.g., where channels are not provisioned from backend server 105 based on the active account profile), access module 520 may also limit access to only particular channels designated within the account profile.

Communication module 530 may include hardware or a combination of hardware and software to send user account information to backend server 105. Account information may include responses to controlled access content, user account settings, accrued time for particular users/devices, user interaction logging, etc. Account information may be sent at particular intervals, such as when a particular set of controlled access content has been competed, or when requested from backend server 105. Alternatively, or additionally, communication module 530 may provide real-time updates of user interaction information and/or device information.

Although FIG. 5 illustrates exemplary functional components of media client 120, in other implementations, media client 120 may include fewer, different, differently arranged, or additional functional components than those depicted in FIG. 5. Additionally, or alternatively, one or more functional components of media client 120 may perform one or more other tasks described as being performed by one or more other functional components of media client 120. Furthermore, one or more functional components described above in relation to backend server 105 or media client 120 may be performed by the other of backend server 105 or media client 120. For example, access module 520 may be performed backend server 105 such that access controls may be implemented primarily through backend server 105.

Figure 6:
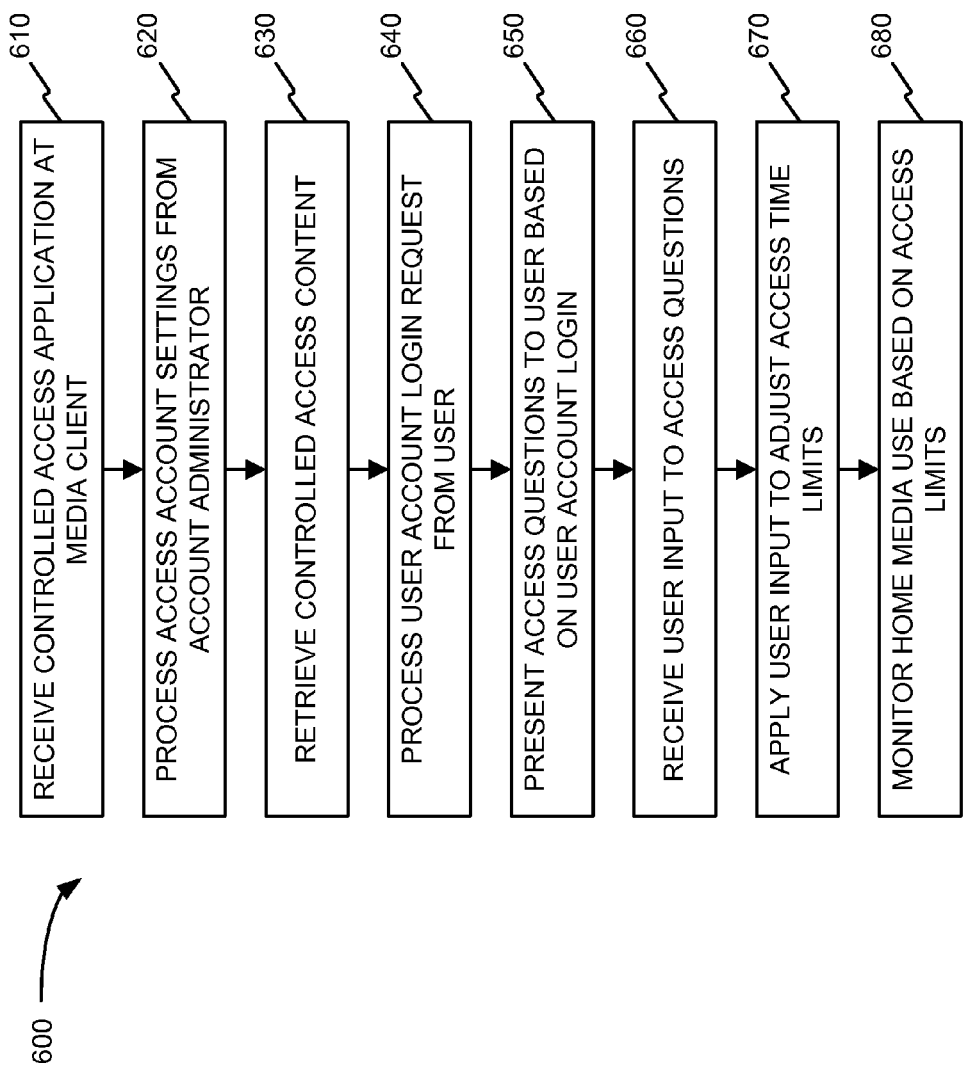
FIGS. 6 and 7 are flow charts illustrating an exemplary process for providing access controls according to an implementation described herein.

FIG. 6 provides a flow chart illustrating an exemplary process 600 for providing access controls according to an implementation described herein. Some or all of process 600 may be performed by one or more media clients associated with a subscription multimedia service, such as media client 120. In some implementations, some or all of process 600 may also be performed by one or more backend servers (e.g., backend server 105) in association with media client 120.

Process 600 may include receiving a controlled access application at a media client (block 610) and processing access account settings from an account administrator (block 620). For example, media client 120 may receive, e.g., from distribution module 440 of backend server 105, one or more applications to facilitate controlled access. Such applications may be implemented in one or more functional components, such as device information detector 500, user interface module 510, access module 520, and communication module 530 described above in connection with FIG. 5. In one implementation, media client 120 (e.g., user interface module 510) may cause display device 125 to present one or more account settings screens to permit an administrator (e.g., parent) to establish controlled access settings for one or more users (e.g., children). User interface module 510 include a template to solicit information to enable an administrator to set controlled access parameters for each user individually, including, for example, age level, time accrual rates, total usage time limits, and/or device-specific usage time limits. User account settings may be stored, for example, in a local memory (e.g., memory 220) and/or sent to backend server 105.

Process 600 may also include retrieving controlled access content (block 630) and processing a user account login request from a user (block 640). For example, media client 120 (e.g., access module 520) may retrieve (e.g., from local memory 220 or from backend server 105) controlled access content (e.g., information and questions) that may be presented to a user upon a successful login. A login may be implemented, for example, by prompting a user for entry of a password associated with a particular user account. Media client 120 may select controlled access content based on the user account profile. In one implementation, media client 120 may retrieve controlled access content in response to a user login. In another implementation, backend server 105 may push the appropriate access content to media client 120, prior to a user login, based on stored profile information.

Process 600 may also include presenting access questions to the user based on the user account login (block 650), receiving user input to the access questions (block 660), and applying the user inputs to adjust the access time limits (block 670). For example, media client 120 (e.g., access module 520) may present controlled access content (e.g., information and associated questions) to the user after a successful login. Media client 120 may track user responses to the controlled access content (e.g., responses to questions) and may credit time for correct answers, according to increments and limits established in the user's account profile. For example, each correct answer may be "earn" a certain amount of usage time or multiple correct answers may be rewarded with a larger block of time.

Process 600 may further include monitoring home media use based on the adjusted access time limits (block 680). For example, media client 120 may track particular device usage by a particular user and compare usage time with accrued limits. Process block 680 may include the process blocks depicted in FIG. 7.

Figure 7:
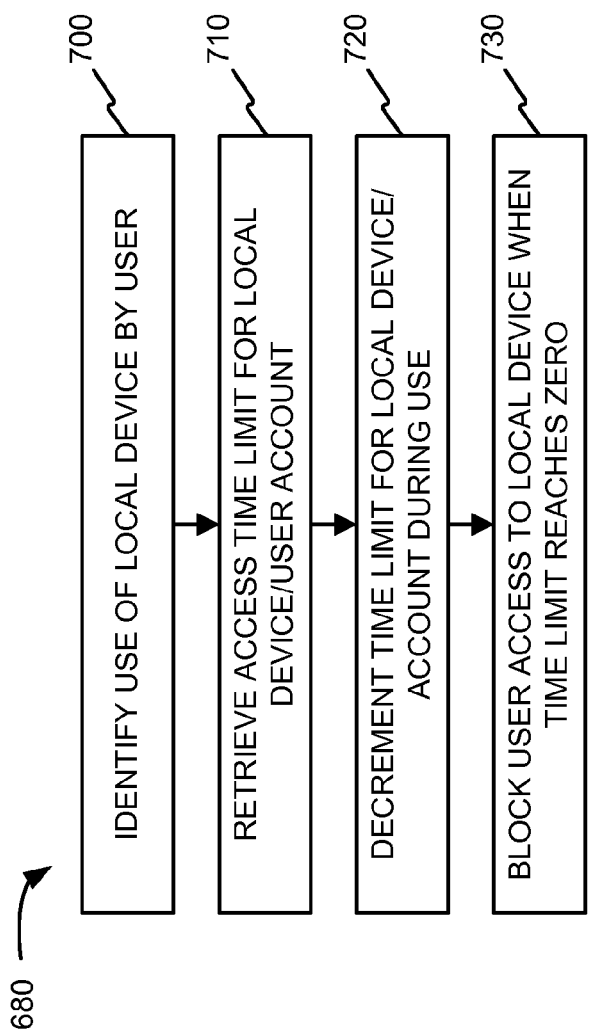

As shown in FIG. 7, process block 680 may include identifying use of a local device by a user (block 700), retrieving an access time limit for the local device and user account (block 710), decrementing the access time limit for the local device and user account during use (block 720), and blocking access by the user account for the local device when the time limit reaches zero or expires (block 730). For example, media client 120 (e.g., device information detector 500) may obtain device information based on connections (e.g., wired or wireless connections) of media client 120 with other devices. Device information detector 500 may track, for example, usage time of individual devices for individual user accounts. For example, device information detector 500 may use a wireless connection with a device to determine if a particular device is being used when a particular user account is active. Media client 120 (e.g., access module 520) may also retrieve usage information (e.g., from device information detector 500) and prevent access to one or more devices (e.g., display device 125, computing device 130, cellular phone 135, telephone 140, and gaming system 145) when the tracked usage time reaches the assigned limit for a particular account profile.

Figure 8:
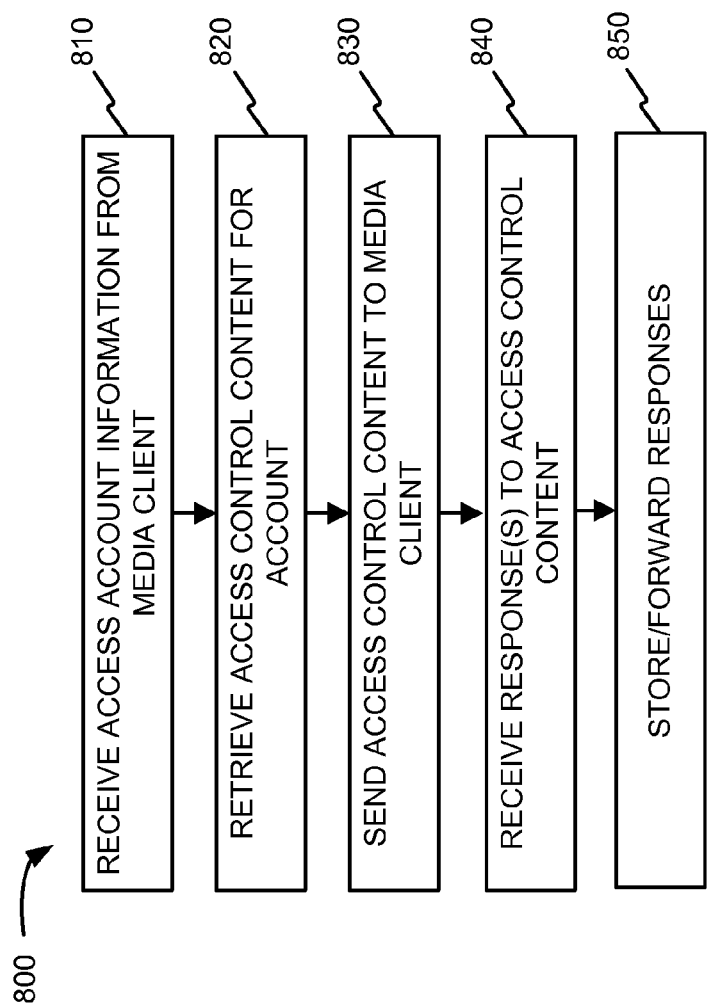
FIG. 8 is a flow chart illustrating an exemplary process for managing an access question package according to an implementation described herein.

FIG. 8 provides a flow chart of an exemplary process 800 for generating an account profile according to implementations described herein. Some or all of process 800 may be performed by one or more servers associated with a subscription multimedia service, such as backend server 105. In some implementations, some or all of process 800 may also be performed by one or more media clients 120 in association with backend server 105.

Process 800 may include receiving access account information from a media client (block 810), retrieving access control content for the access account (block 820), and sending the access control content to the media client (block 830). For example, backend server 105 (e.g., account settings module 410) may store and retrieve account profile information for administrators and/or users of media clients 120. Account settings module 410 may include, for example, information that may enable backend server 105 and/or media client 120 to identify access questions to be presented to a user during a controlled access process. Backend server 105 (e.g., question generator module 430) may determine a customized set of access questions for presentation by a particular media client 120 to a particular user (based, e.g., on a user account login). For example, question generator module 430 may receive a request from media client 120 to generate a customized set of access questions for a particular user account. In response to the request, question generator module 430 may retrieve (e.g., from third party interface 420, catalog module 450, or another device) an age-appropriate set of access questions for the particular user account and provide the set of access questions to the respective media client 120.

Responses to the access control content may be received (block 840), and the responses may be stored and/or forwarded (block 850). For example, backend server 105 (e.g., activity/device tracker 400) receive and/or solicit user activity data and local device data from media clients 120. For example, activity/device tracker 400 may receive user input histories (e.g., user responses to access questions). Backend server 105 (e.g., third-party interface 420 may send data (e.g., user responses to questions) received from media client 120. In one implementation, where third-party server 175 is an educational institution, the data may constitute a user's completed assignment (e.g., a homework assignment).

FIGS. 9A-9E provide exemplary diagrams illustrating implementations of an administrator interface for establishing access control settings. Referring collectively to FIG. 9A-9E, a person logged in as an administrator may interact with media client 120 and display device 125 via a remote control 900. Remote control 900 may include a range of devices including function specific keys, number keys, and/or a full-text key pad. An administrator and/or a user may interact with media client 120 using a keypad that is part of remote control 900, and signals representing key depressions may be transmitted to media client 120 via an infrared transmission or another type of transmission. Remote control 900 may allow an administrator/user to navigate interactive menus, manipulate a program guide, select channels or programs for viewing, adjust display characteristics, and/or perform other interactive functions related to viewing multimedia content. The display on display device 125 may be controlled by media client 120 as directed by user commands from remote control 900.

Figure 9A:
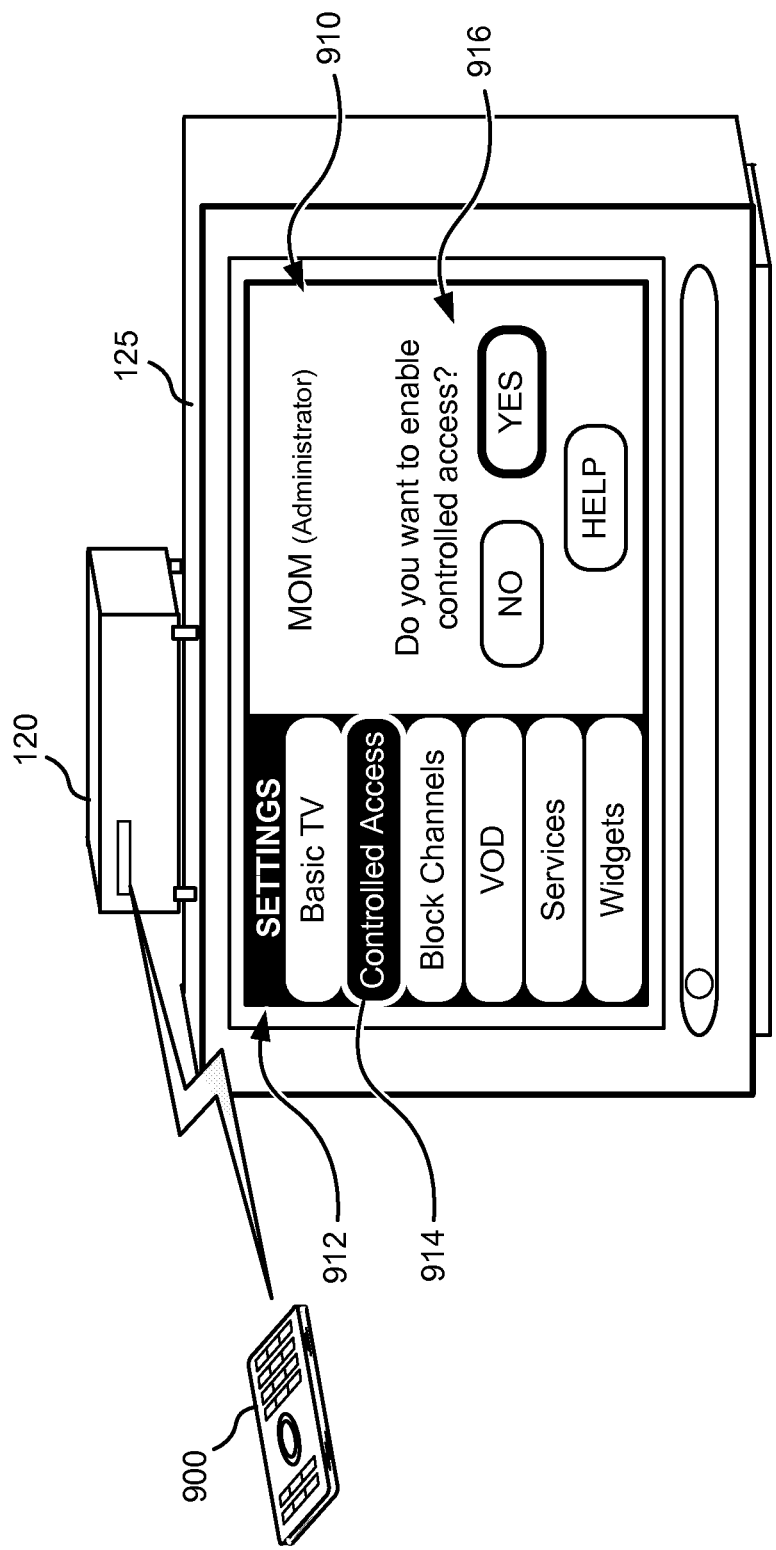
FIGS. 9A through 9E are exemplary diagrams illustrating implementations of an administrator interface for establishing access control settings.

FIG. 9A provides an exemplary diagram of an on-screen display 910 that may include access options for various setting including a controlled access setting. Display 910 may include an interactive settings menu 912. Interactive setting menu 912 may include multiple categories of settings that may include a controlled access category 914. Highlighting controlled access category 914 (e.g., via commands from remote control 900) may cause media client 120 to display options 916 for enabling controlled access of devices within customer premises 160 (not shown). Selection of the option "Yes," as shown in FIG. 9A, may cause media client 120 to cause another on-screen display 920 to be presented, as shown in FIG. 9B.

Figure 9B:
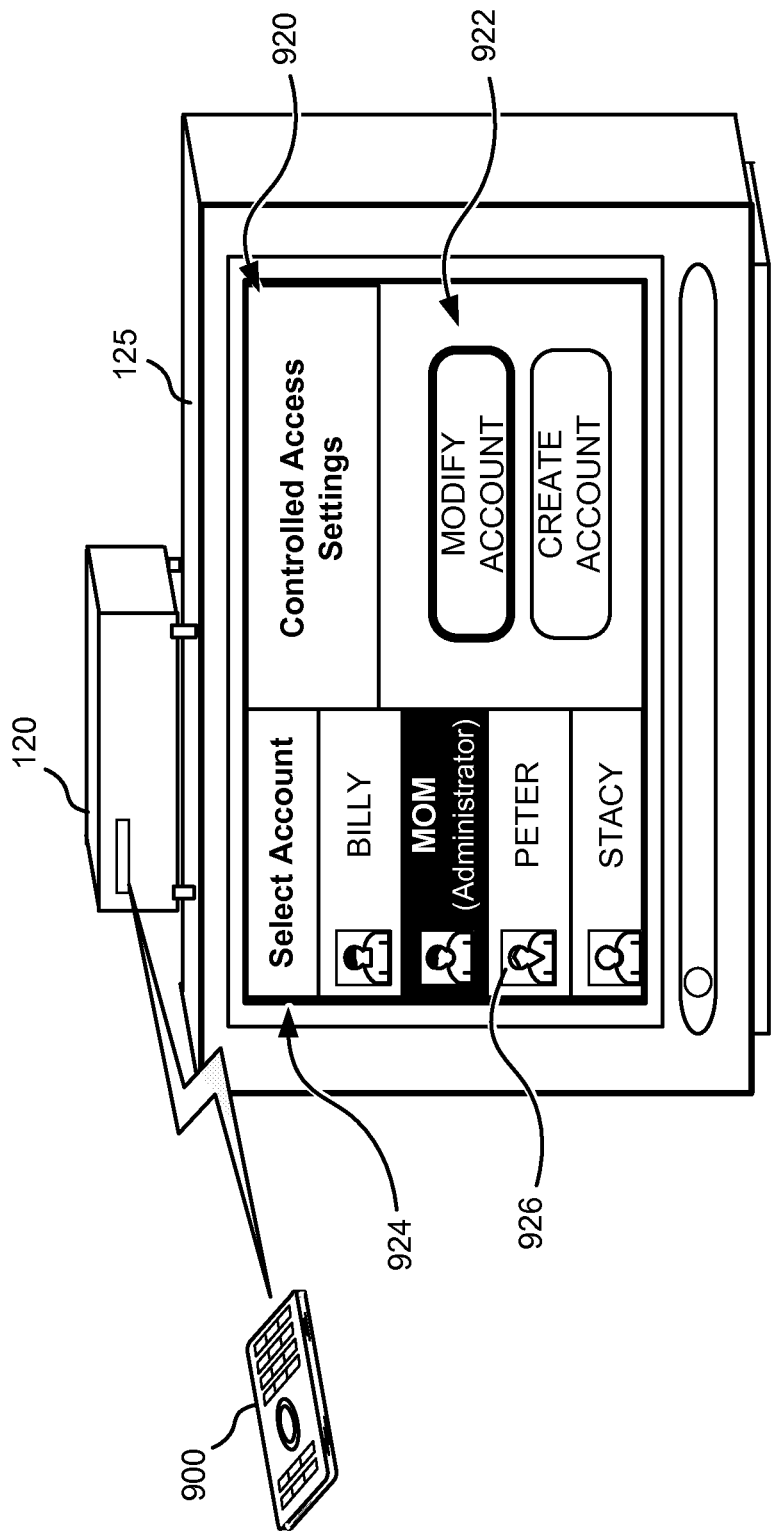

FIG. 9B provides an exemplary diagram of on-screen display 920 that includes a menu 922 with options to, for example, modify or create an existing account. Other options (not shown) may include deleting an existing account. On-screen display 920 may also include a menu 924 of existing accounts that may be selected to modify. As shown in FIG. 9B, accounts may be associated with a particular user and may include customizable avatars (or icons) 926. Highlighting a particular existing account from menu 924 (e.g., via a command from remote control 900) and selecting the option "Modify Account," from menu 922, as shown in FIG. 9B, may cause media client 120 to cause another on-screen display 930 to be presented, as shown in FIG. 9C.

Figure 9C:
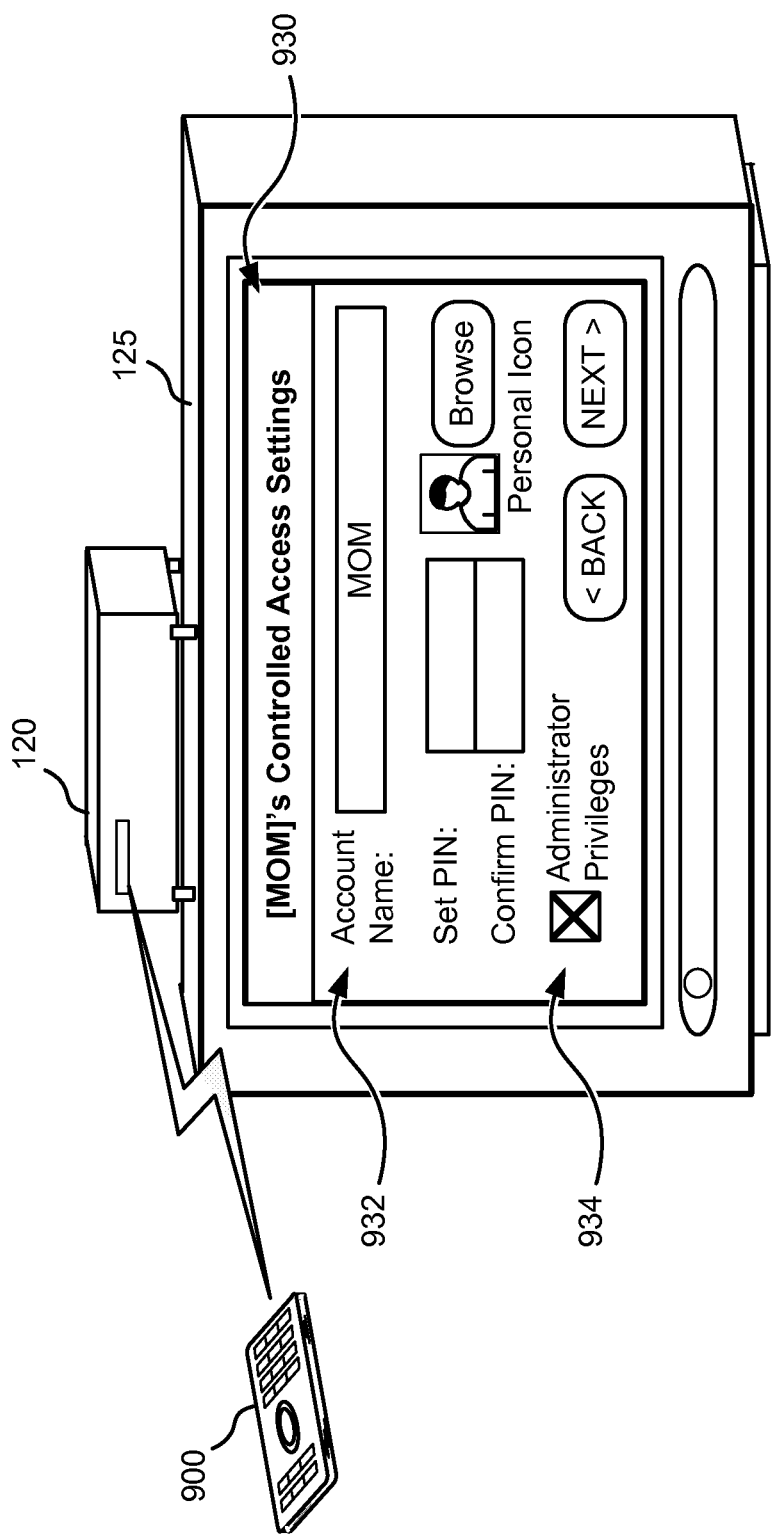

FIG. 9C provides an exemplary diagram of on-screen display 930 that includes an access settings template 932 with configurable settings for an existing account (e.g., "Mom's" account). Configurable settings may include, for example, an account name, a personal identification number (PIN) or password, an avatar, and/or enablement of administrator privileges. An administrator privileges selection 934 may provide the ability to create/modify account settings for other user accounts (e.g., a new account or an existing account from menu 924).

Figure 9D:
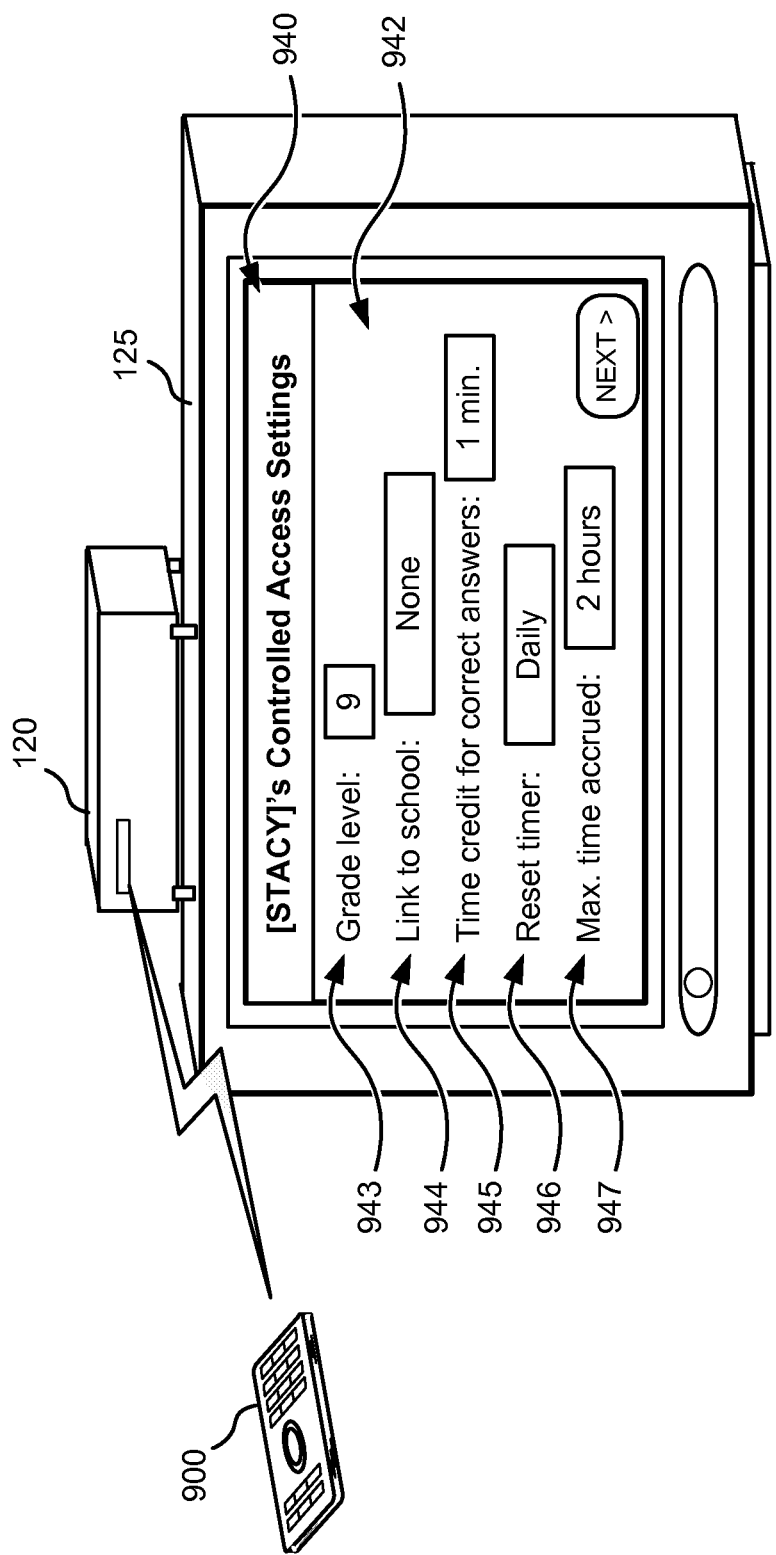

FIG. 9D provides an exemplary diagram of an on-screen display 940 that includes another access settings template 942 with configurable settings for an existing user account (e.g., "Stacy's" account). User account settings, including on-screen display 940, generally may be accessible, for example, when administrator privileges selection 934 of access settings template 932 is not selected. As shown in FIG. 9D, configurable user account settings may include, for example, a grade level 943 for the user account, a link to school option 944, a time credit option 945, a reset cycle option 946, and a maximum accrual time option 947. Additionally, or alternatively, other configurable settings (not shown) may also include types of topics/questions; question formats (e.g., multiple choice, true/false, short answer, etc.); access control periods (e.g., weekdays/weekends, particular days/portions of days, etc. when access controls are in effect); etc.

Grade level 943 may be used to indicate a projected academic ability (or scholastic ability) of a user. Grade level 943 may be used by media client 120 and/or backend server 105 to identify age-appropriate questions for a user. Grade level 943 may be expressed in terms of a school grade, age, or a subjective measure (e.g., beginner, intermediate, advanced, etc.).

Link to school option 944 may associate a user account with a participating school (e.g., a school attended by the user of the user account). For example, particular schools may contract with an operator of provider network 170 to supply questions (e.g., homework assignments, extra-credit questions, etc. supplied from third-party server 175) that may be used for the controlled access system. Particular schools may be selected for link to school option 944 from, for example, a drop-down menu, a keyword search, and/or a geographic-based (e.g., area code) list, etc.

Time credit option 945 may include time increments (e.g., seconds, minutes, etc.) that may be credited to a user account when a correct answer is provided to a question. In other implementations, time credit option 945 may provide time credits for any answer, or may provide different credit values for different categories of questions. For example, as shown in FIG. 9D, a user account may be set to credit 1 minute of time for each correct answer to a question. In other implementations, settings may be configured to credit time differently based on an identified level of difficulty of an individual question (e.g., 1 minute for basic questions, 2 minutes for difficult questions, etc.). In still other implementations, time credit option 945 may provide time credits for multiple correct questions (e.g., 25 correct answers credited 30 minutes).

Reset timer option 946 may include time increments (e.g., days, weeks, etc.) for which a user account may retain accrued time credits. For example, accrued use time (e.g., generated from correct answers to questions) may be zeroed out after each day or at the end of each week. Alternatively, reset timer 946 may be set so that accrued time is never reset.

Maximum accrued time option 947 may include a time value (e.g., minutes, hours, etc.) representing the maximum time that can be credited to the user account. For example, maximum accrued time option 947 may be set to a maximum of 2 hours. Alternatively, maximum accrued time option 947 may be set so that there is no maximum time.

Figure 9E:
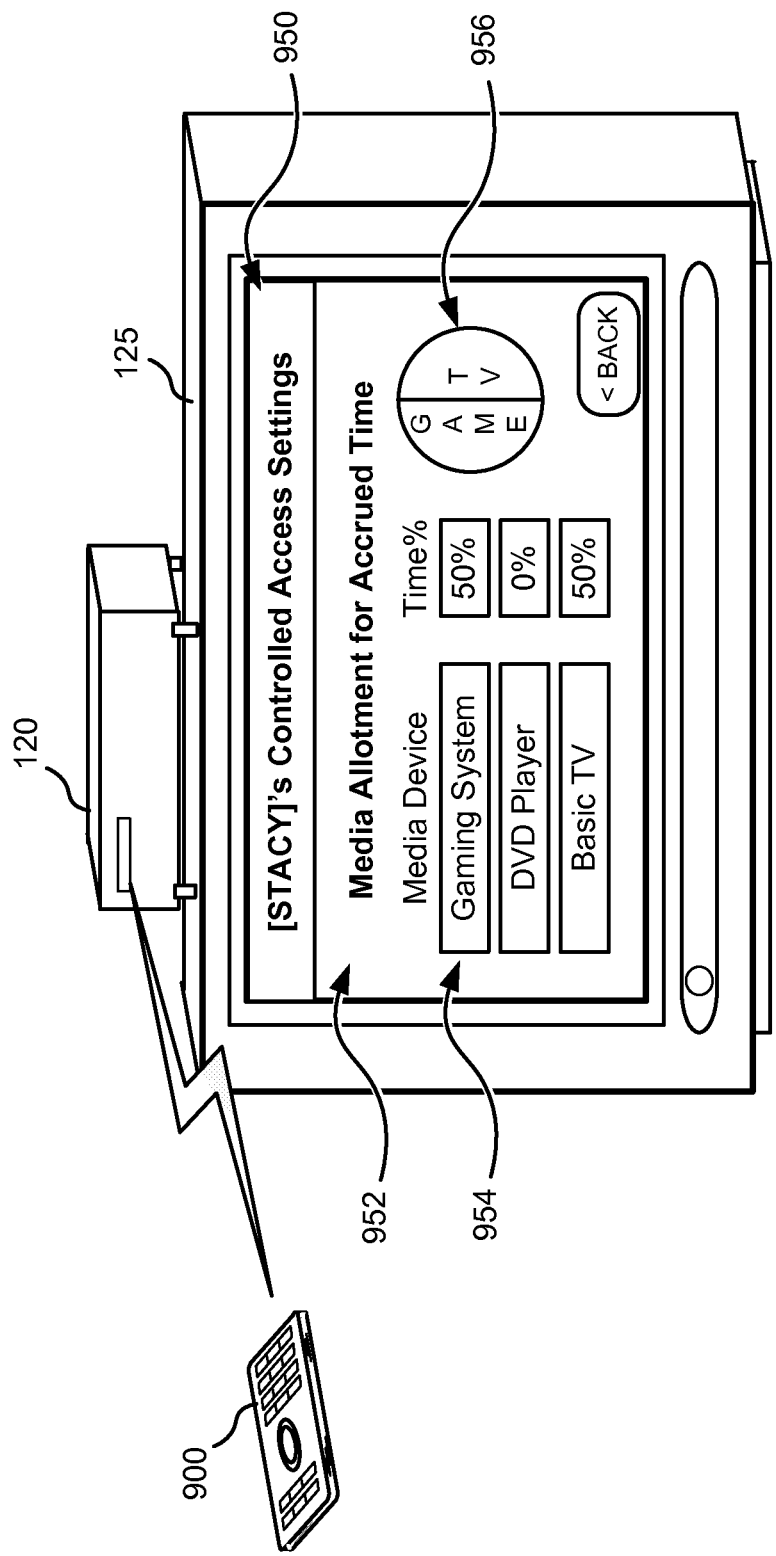

FIG. 9E provides an exemplary diagram of an on-screen display 950 that includes another access settings template 952 with configurable settings for an existing user account (e.g., "Stacy's" account). On-screen display 950 may be presented as a following screen to on-screen display 940. For example, selection of the option "Next," as shown in FIG. 9D, may cause media client 120 to cause on-screen display 950 to be presented, as shown in FIG. 9E. Template 952 may include configurable user account settings for particular media devices (e.g., display device 125, computing device 130, cellular phone 135, telephone 140, gaming system 145, etc.). Media client 120 may monitor time (e.g., accrued/used time) for particular device (e.g., devices within customer premises 160) identified by media client 120. As shown in FIG. 9E, a gaming system, a DVD player, and basic television have been identified in a menu 954. An administrator may thus, divide accrued time among multiple devices, and media client 120 may limit access to those devices to the designated percentage of total time. In one implementation, template 952 may include a graphic 956 to indicate selected percentages. In another implementation, menu 954 may also include selections to monitor time for features associated with a particular device. For example, categories of television channels (e.g., educational, sports, kids, etc.) may be allotted different percentages.

FIGS. 9A-9E provide illustrative examples of formats for defining controlled access settings according to implementations herein. Other formats may also be used. For example, while the settings of FIG. 9D have been described as applying to all devices, in another implementation access settings may be set individually for each device (e.g., display device 125, computing device 130, cellular phone 135, telephone 140, gaming system 145, etc.). For example, time credit for gaming system 145 may be accrued at a different rate or for more difficult questions as compared to telephone 140. Additionally, or alternatively, menus shown in FIGS. 9A-9E may provided a variety of formats, including use of sub-menus, drop-down menus, text entry fields, select boxes, radio buttons, check boxes, etc.

FIGS. 10A-10D provide exemplary diagrams illustrating implementations of a user interface for using access controls. Referring collectively to FIG. 10A-10D, a person logged in as a user may interact with media client 120 and display device 125 via a remote control 900. The display on display device 125 may be controlled by media client 120 in response to user commands from remote control 900.

Figure 10A:
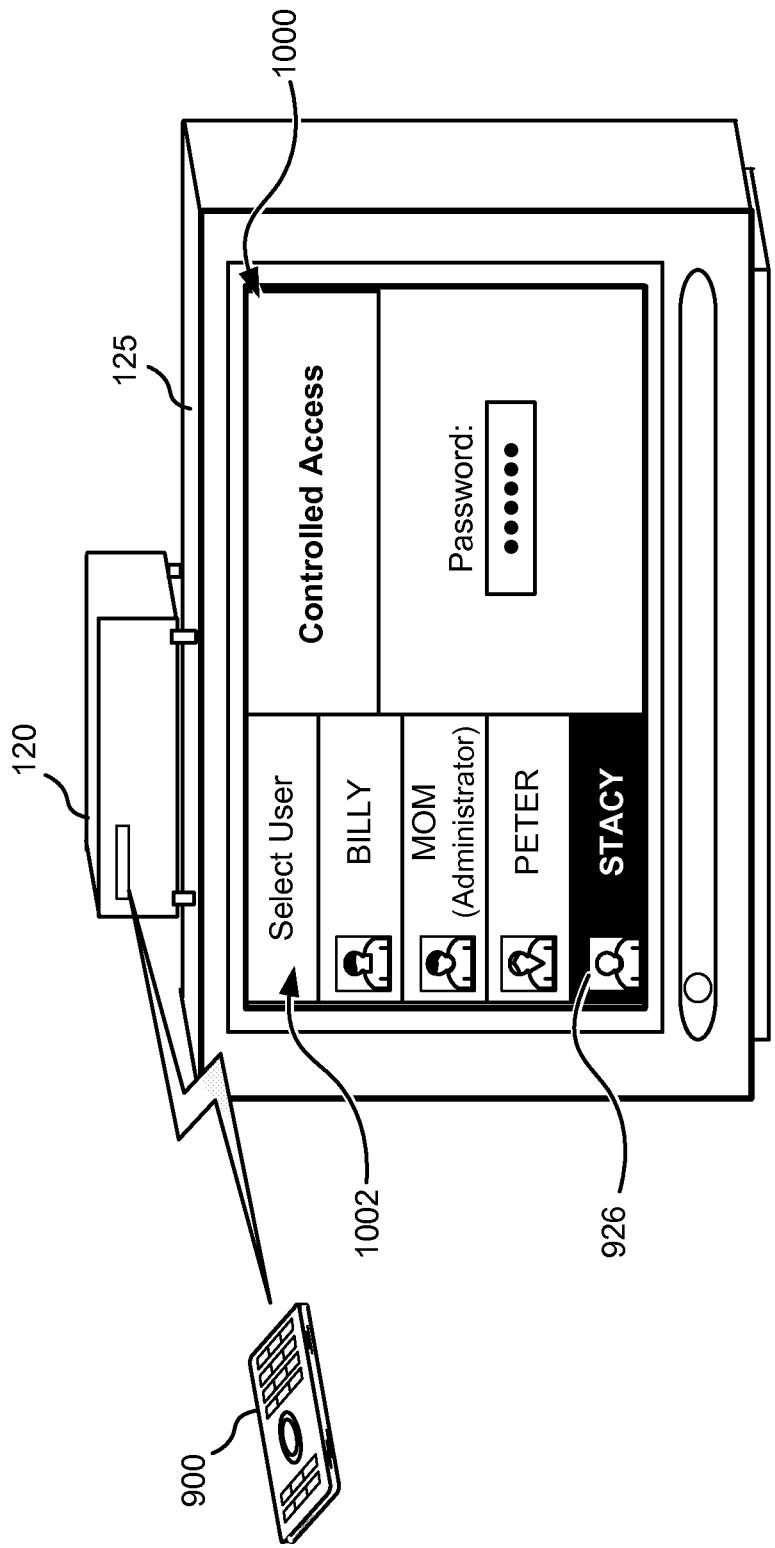
FIGS. 10A through 10D are exemplary diagrams illustrating implementations of a user interface for using access controls.

FIG. 10A provides an exemplary diagram of an on-screen display 1000 that includes a start-up screen in a controlled access environment. On-screen display 1000 may also include a menu 1002 of existing user accounts that may be selected. As shown in FIG. 10A, user accounts may be associated with a particular user and may include customizable avatars (or icons) 926. Highlighting a particular existing account from menu 1002 (e.g., via a command from remote control 900) and entering a corresponding PIN (or password), as shown in FIG. 10A, may cause media client 120 to cause another on-screen display 1002 to be presented, as shown in FIG. 10B.

Figure 10B:
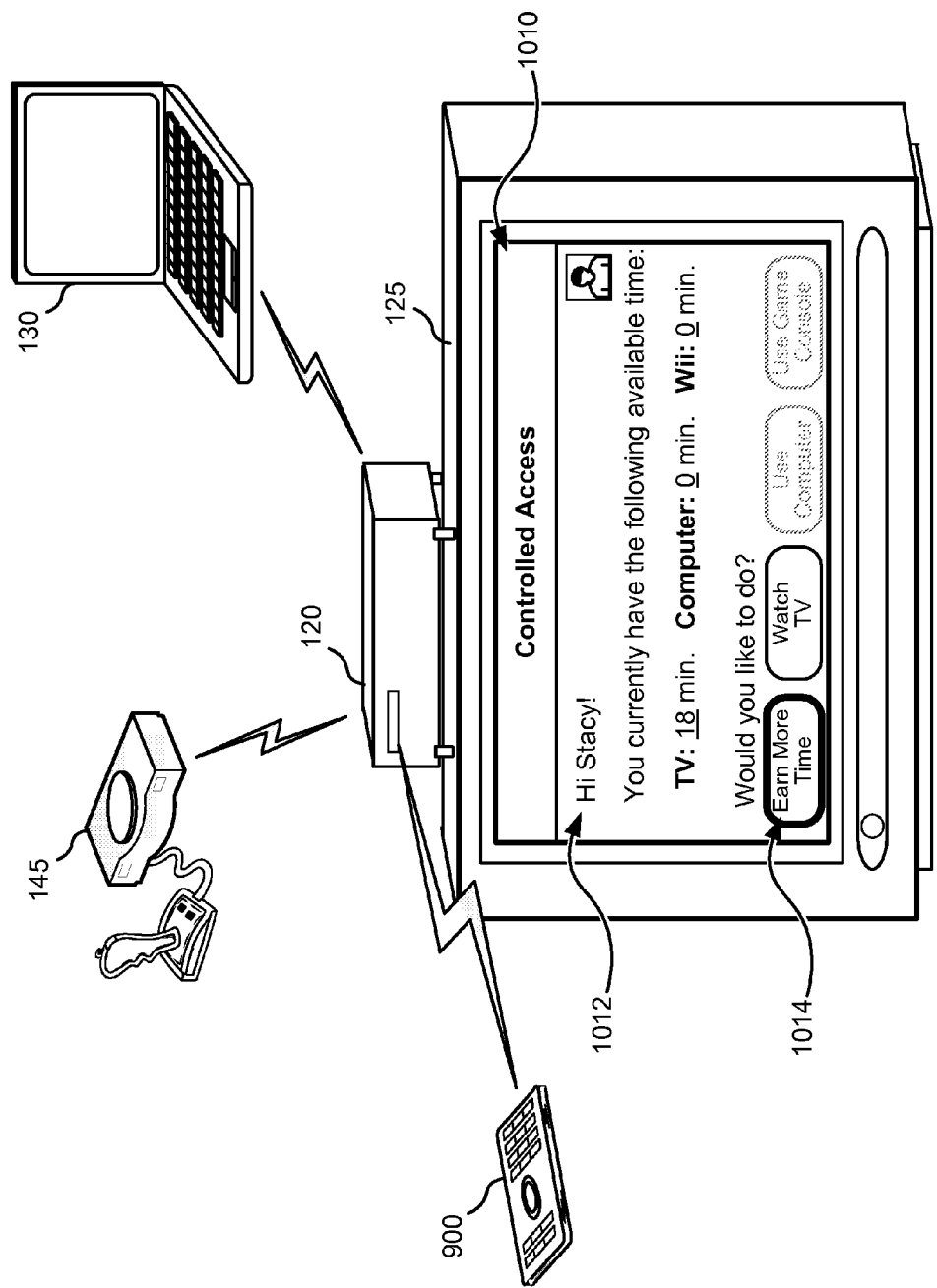

FIG. 10B provides an exemplary diagram of an on-screen display 1010 that includes a welcome screen 1012 after a successful login in a controlled access environment. Welcome screen 1012 may include a message to the user informing them of available accrued time. Welcome screen 1012 may also include selectable options 1014 to enable the user to, for example, accrue more time or use previously accrued time for an existing device. Selectable options 1014 may correspond, for example, to available devices identified (by an administrator) for the user account, such as display device 125, computer 130, and gaming system 145. Selection of the option "Earn More Time," as shown in FIG. 10B, may cause media client 120 to cause another on-screen display 1020 to be presented, as shown in FIG. 10C.

Figure 10C:
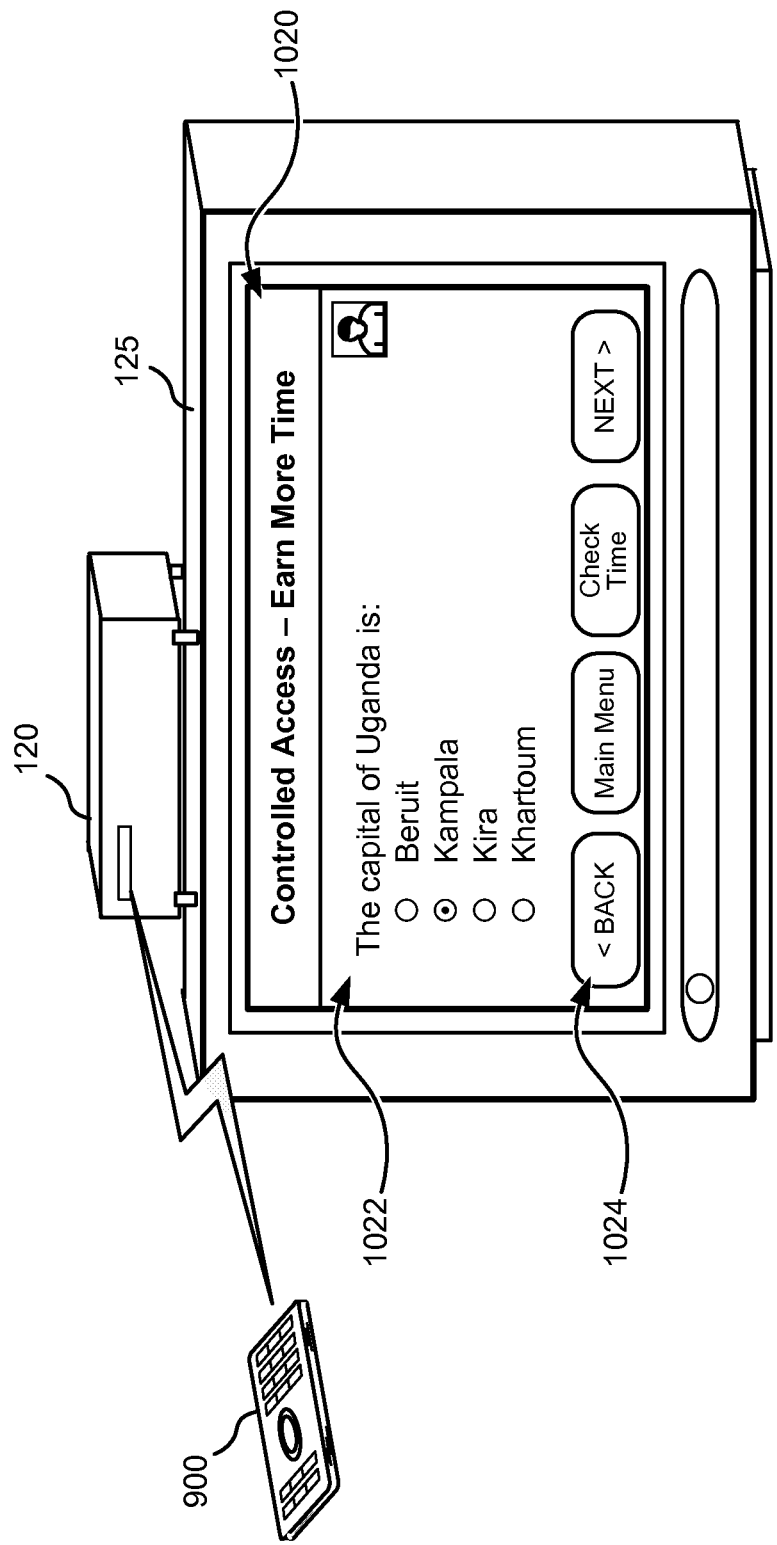

FIG. 10C provides an exemplary diagram of an on-screen display 1020 that includes controlled access content in the form of an access question 1022. Access question 1022 may be retrieved by media client 120 from a question package in accordance with the user's account settings. As shown in FIG. 10C, a user may select a particular answer (e.g., via a command from remote control 900) for access question 1022. Media client 120 may credit time for correct answers in accordance with the user's account settings. A submenu 1024 may provide a user with options to, for example, navigate to other questions (e.g., "Back," "Next"), return to a home page (e.g., "Main Menu," such as on-screen display 1010 of FIG. 10B), or check the amount of accrued time (e.g., "Check Time").

Figure 10D:
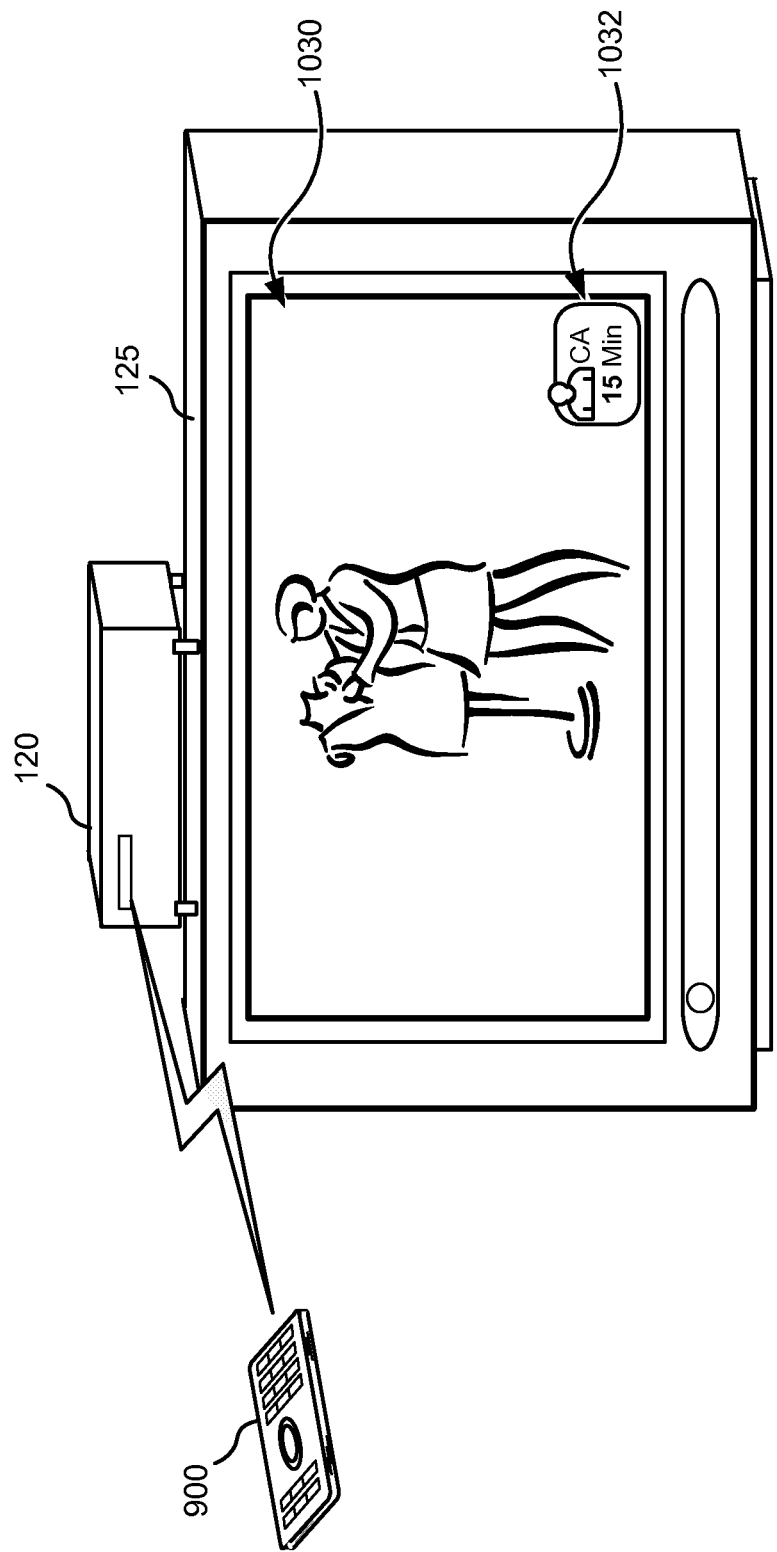

Referring back to FIG. 10B, selection of the option "Watch TV," as shown in FIG. 10B, may cause media client 120 to cause another on-screen display 1030 to be presented, as shown in FIG. 10D. Media client 120 may allow access to television content (in accordance with channel restrictions and/or accrued time limits). In one implementation, media client 120 may also display a widget 1032 (e.g., an icon representing a small software application) to keep a user apprised of current time limits. A user may also select widget 1032 (via remote control 900) to return to a previous controlled access menu (e.g., on-screen display 1010 of FIG. 10B).

FIGS. 10A-10D provide illustrative examples of formats for implementing controlled access settings according to implementations herein. Other formats may also be used.

Implementations described herein may provide systems and/or methods that may store separate account settings for multiple user accounts, where each of the separate user accounts includes access time limits for use of devices associated with the media client. The media client may also receive a login request for one of the user accounts, and may retrieve, either locally or from a remote server and based on account settings for the active account, interactive content for the active account. The media client may present to a user of the active account the interactive content and may receive user input responding to the interactive content. The media client may adjust the access time limits for the devices, based on the user input and the account settings for the active account, and may monitor usage time of the devices by the user of the active account. The media client may blocks access to one of the devices when a monitored usage time exceeds the adjusted access time limit for the corresponding device.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while series of blocks have been described with regard to the flowcharts of FIGS. 6-8, the order of the blocks may differ in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
receiving, by a media client, user account settings pertaining to access of media devices associated with the media client;
retrieving, by the media client and based on the user account settings, academic questions;
processing, by the media client, a login request by a user of a user account associated with the user account settings;
providing, by the media client and for presentation, the academic questions based on the processing of the login request;
receiving, by the media client, answers to the academic questions;
determining, by the media client, a particular amount of time based on the answers;
adjusting, by the media client, access time limits, associated with the user account, by dividing the particular amount of time among the media devices based on different percentages allotted to the media devices;
monitoring, by the media client, a usage time based on a use, by the user, of a particular media device of the media devices; and
restricting, by the media client, access to the particular media device when the usage time exceeds a particular access time limit, associated with the media device, of the access time limits.

2. The method of claim 1, further comprising:
sending information regarding the answers to a remote server that provides the academic questions.

3. The method of claim 1, where the media devices include one or more of:
a television display,
a personal computer,
a cellular phone,
a telephone,
a gaming system,
a digital video disc (DVD) player, or
a digital video recorder (DVR).

4. The method of claim 1, where the academic questions are associated with academic assignments from a school of the user.

5. The method of claim 1,
where the user account settings identify a projected academic ability of the user, and
where the academic questions are based on the projected academic ability.

6. The method of claim 1, where the media devices are connected to the media client via at least one of wired connections or wireless connections within a customer premises.

7. A device comprising:
a memory to store information associated with multiple user accounts,
a particular account, of the multiple user accounts, including information regarding access time limits for use of media devices associated with the device; and
a processor to:
receive a login request for the particular account,
retrieve, based on account settings for the particular account, academic questions,
provide, for presentation to a user of the particular account and after receiving the login request, the academic questions,
receive answers to the academic questions,
determine a particular amount of time based on the answers,
adjust the access time limits by dividing the particular amount of time among the media devices based on different percentages designated to the media devices in the account settings,
monitor a usage time based on a use of a particular media device, of the media devices, by the user, and
block access to the particular media device when the usage time exceeds a particular access time limit, of the access time limits, for the particular media device.

8. The device of claim 7,
where the account settings include a projected academic ability of the user, and
where the academic questions are based on the projected academic ability of the user.

9. The device of claim 7, where the processor is further to:
provide, for presentation to an administrator, an interactive menu, and
receive, via the interactive menu, information for the account settings.

10. The device of claim 7, where, when retrieving the academic questions, the processor is to:
send, to a server, information based the account settings, and
receive the academic questions from the server after sending the information.

11. The device of claim 7, where, when retrieving the academic questions, the processor is to:
select the academic questions from a stored collection of interactive content.

12. The device of claim 7, where, when retrieving the academic questions, the processor is to:
retrieve the academic questions from a remote server via a network.

13. The device of claim 7, where the device is one or more of:
a set-top box,
a computer,
a cable card, or
a portable electronic device.

14. A system comprising:
a media client associated with multiple media devices in a home network,
the media client being to:
identify a projected academic ability for a user account;
associate the user account with usage time limits for the multiple media devices,
provide academic questions based on the projected academic ability,
receive answers to the academic questions,
determine a particular amount of time based on the answers,
adjust the usage time limits by dividing the particular amount of time among the usage time limits based on different percentages allotted to the multiple media devices in the user account,
monitor a particular usage time based on a use, by a user associated with the user account, of a particular media device of the multiple media devices, and
block access to the particular media device when the particular usage time reaches a corresponding usage time limit, of the usage time limits, associated with the particular media device.

15. The system of claim 14, where the media client is further to:
provide the projected academic ability to a first server that receives the academic questions from a second server that is associated with a school of the user, and receive the academic questions from the first server.

16. The system of claim 15,
where the media client is further to:
forward the answers to the first server, and
where the first server is to update the projected academic ability based on the answers.

17. The system of claim 14,
where the different percentages include:
a first percentage allotted to the particular media device, and
a second percentage allotted to a different media device of the multiple media devices,
where a first type of the particular media device is different from a second type of the different media device, and
where the first percentage is different from the second percentage.

18. The system of claim 14, where, when providing the academic questions, the media client is further to:
provide, for presentation to the user, an option to earn more time,
receive information regarding a selection of the option, and
provide, for presentation to the user and based on the selection of the option, at least one of the academic questions.

19. The system of claim 14, where the processor is to:
receive a login request from a user associated with the user account, and
process the login request before providing the academic questions.

20. A non-transitory computer-readable medium storing instructions, the instructions comprising:
one or more instructions that, when executed by at least one processor of a media client, cause the at least one processor to:
provide, for presentation to a user associated with the media client, academic questions;
receive answers to the academic questions;
determine a particular amount of time based on the answers;
adjust access time limits associated with the user and a plurality of media devices by dividing the particular amount of time based on different percentages selected for the plurality of media devices;
determine a usage time based on a use of a media device, of the plurality of media devices, by the user; and
block access to the media device when the usage time reaches one of the usage time limits associated with the media device.

21. The non-transitory computer-readable medium of claim 20, where the instructions further comprise:
one or more instructions that, when executed by the at least one processor, cause the at least one processor to:
transmit an indication of a projected academic ability associated with the user, and
receive the academic questions based on the projected academic ability.

22. The non-transitory computer-readable medium of claim 20, where the different percentages and the usage time limits are selected by an account administrator associated with the media client.

23. The non-transitory computer-readable medium of claim 20, where the instructions further comprise:
one or more instructions that, when executed by the at least one processor, cause the at least one processor to:
send, to a server, information associated with a user account of the user, and
receive the academic questions from the server based on the information associated with the user account.

24. The non-transitory computer-readable medium of claim 20, where the one or more instructions to provide the academic questions comprise:
one or more instructions that, when executed by the at least one processor, cause the at least one processor to:
provide, for presentation to the user, an option to earn more time,
receive information regarding a selection of the option, and
provide, for presentation to the user and based on the selection of the option, at least one of the academic questions.

* * * * *